(12) United States Patent
Kazmi et al.

(10) Patent No.: US 11,589,249 B2
(45) Date of Patent: *Feb. 21, 2023

(54) EXCHANGE OF PARAMETERS RELATING TO MEASUREMENT PERIODS

(71) Applicant: TELEFONAKTIEBOLAGET LM ERICSSON (PUBL), Stockholm (SE)

(72) Inventors: Muhammad Kazmi, Sundbyberg (SE); Tao Cui, Upplands Väsby (SE)

(73) Assignee: TELEFONAKTIEBOLAGET L M ERICSSON (PUB), Stockholm (SE)

( * ) Notice: Subject to any disclaimer, the term of this patent is extended or adjusted under 35 U.S.C. 154(b) by 4 days.

This patent is subject to a terminal disclaimer.

(21) Appl. No.: 17/228,774

(22) Filed: Apr. 13, 2021

(65) Prior Publication Data
US 2021/0235294 A1 Jul. 29, 2021

Related U.S. Application Data

(63) Continuation of application No. 16/502,142, filed on Jul. 3, 2019, now Pat. No. 11,006,299, which is a
(Continued)

(51) Int. Cl.
*H04W 72/00* (2009.01)
*H04W 24/08* (2009.01)
(Continued)

(52) U.S. Cl.
CPC ......... *H04W 24/08* (2013.01); *H04L 5/0078* (2013.01); *H04L 5/0091* (2013.01);
(Continued)

(58) Field of Classification Search
CPC . H04W 36/0094; H04W 36/30; H04W 64/00; H04W 48/02; H04W 80/04; H04W 88/06; H04L 5/0091; H04L 5/0078
See application file for complete search history.

(56) References Cited

U.S. PATENT DOCUMENTS

| 6,982,959 B1 | 1/2006 | Salonaho et al. |
| 8,537,802 B2 | 9/2013 | Erell et al. |

(Continued)

FOREIGN PATENT DOCUMENTS

| CN | 101674586 A | 3/2010 |
| EP | 2385723 A1 | 11/2011 |

(Continued)

OTHER PUBLICATIONS

Office Action received in related Brazilian Application No. BR112013013247-7, dated Nov. 22, 2021.
(Continued)

*Primary Examiner* — Lan-Huong Truong
(74) *Attorney, Agent, or Firm* — Patent Portfolio Builders PLLC

(57) ABSTRACT

Methods, a first, and a second network node as well as a user equipment for exchange of measurement period related parameters are provided. The user equipment performs a method for measuring a measurement quantity of a secondary cell on a second carrier operated by a second radio network node. The user equipment receives, from the second radio network node, an indication indicative of the second carrier and a first parameter indicating a measurement period for measuring the measurement quantity of the secondary cell. The user equipment measures said measurement quantity on the secondary cell on the second carrier over the measurement period. The measurement period is a predefined value times the first parameter.

11 Claims, 9 Drawing Sheets

Related U.S. Application Data continuation of application No. 15/062,703, filed on Mar. 7, 2016, now Pat. No. 10,390,242, which is a continuation of application No. 13/377,180, filed as application No. PCT/SE2011/051044 on Aug. 31, 2011, now Pat. No. 9,319,204.

(60) Provisional application No. 61/422,388, filed on Dec. 13, 2010.

(51) Int. Cl.

| | | |
|---|---|---|
| *H04L 5/00* | (2006.01) | |
| *H04W 36/00* | (2009.01) | |
| *H04W 64/00* | (2009.01) | |
| *H04W 88/02* | (2009.01) | |
| *H04W 88/08* | (2009.01) | |

(52) U.S. Cl.
CPC ....... *H04W 36/0094* (2013.01); *H04W 64/00* (2013.01); *H04W 88/02* (2013.01); *H04W 88/08* (2013.01)

(56) References Cited

U.S. PATENT DOCUMENTS

| 8,902,768 | B2 | 12/2014 | Jung et al. |
|---|---|---|---|
| 2003/0117980 | A1 | 6/2003 | Kim et al. |
| 2005/0250502 | A1 | 11/2005 | Laroia et al. |
| 2007/0177536 | A1 | 8/2007 | Brueck et al. |
| 2008/0254820 | A1 | 10/2008 | Alpert et al. |
| 2009/0069007 | A1 | 3/2009 | Xiao |
| 2010/0279707 | A1 | 11/2010 | Fischer et al. |
| 2010/0296410 | A1 | 11/2010 | Kazmi et al. |
| 2011/0002281 | A1 | 1/2011 | Terry et al. |
| 2011/0081868 | A1 | 4/2011 | Kim et al. |
| 2011/0105162 | A1 | 5/2011 | Kim et al. |
| 2011/0143770 | A1 | 6/2011 | Charbit et al. |
| 2011/0170496 | A1 | 7/2011 | Fong et al. |
| 2011/0195706 | A1 | 8/2011 | Nakamori et al. |
| 2011/0281587 | A1 | 11/2011 | Jokinen et al. |
| 2012/0009938 | A1 | 1/2012 | Liu et al. |
| 2012/0115463 | A1 | 5/2012 | Weng et al. |
| 2013/0176883 | A1 | 7/2013 | Han et al. |
| 2013/0329635 | A1 | 12/2013 | Lee et al. |

FOREIGN PATENT DOCUMENTS

| EP | 2664202 A1 | 11/2013 |
|---|---|---|
| EP | 2742737 A1 | 6/2014 |
| WO | 2009096846 A1 | 8/2009 |
| WO | 2009096846 A8 | 8/2009 |
| WO | 2010021279 A1 | 2/2010 |
| WO | 2010052376 A1 | 5/2010 |
| WO | 2012096608 A1 | 7/2012 |
| WO | 2013025154 A1 | 2/2013 |

OTHER PUBLICATIONS

Extended European Search Report in corresponding/related European Application No. 20209623.6 dated May 31, 2021.
3GPP TSG-RAN WG4 Meeting 2010 AH#4, R4-103676, NPL, li'an, China, Oct. 11-15, 2010; "Measurement core requirement for secondary component cariers when Scell is deactivated" (Year: 2010).
3GPP TSG-RAN WG4 Meeting#57; Nokia Siemens Networks "Additional RRM requirement for carrier aggregation", Jacksonville, USA, Nov. 15-19, 2010 (Year: 2010).
3GPP; "3rd Generation Partnership Project; Technical Specification Group Radio Access Network; Evolved Universal Terrestrial Radio Access (E-UTRA); Physical Layer—Measurements (Release 8)"; 3GPP TS 36.214 V8.1.0; Nov. 2011, Technical Specification; pp. 1-9; Sophia Antipolis, Valbonne, France.
3GPP; "3rd Generation Partnership Project; Technical Specification Group Radio Access Network; Evolved Universal Terrestrial Radio Access (E-UTRA); Physical Layer—Measurements (Release 8)"; 3GPP TS 36.214 V8.1.0; Nov. 2007, Technical Specification; pp. 1-9; Sophia Antipolis, Valbonne, France.
3GPP; "3rd Generation Partnership Project; Technical Specification Group Radio Access Network; Evolved Universal Terrestrial Radio Access (E-UTRA); Physical Layer—Measurements (Release 9)"; 3GPP TS 36.214 V9.2.0; Jun. 2010, Technical Specification; pp. 1-14; Sophia Antipolis, Valbonne, France.
3GPP; "3rd Generation Partnership Project; Technical Specification Group Radio Access Network; Evolved Universal Terrestrial Radio Access (E-UTRA); Requirements for support of radio resource management (Release 9)"; 3GPP TS 36.133 V9.5.0; Oct. 2010, Technical Specification; pp. 1-388; Sophia Antipolis, Valbonne, France.
3GPP; 3rd Generation Partnership Project; Technical Specification Group Radio Access Network; Physical layer aspects for evolved Universal Terrestrial Radio Access (UTRA) (Release 7); 3 GPP TR 25.814 V7.1.0 (Sep. 2006) Sep. 2006; 132 pages.
Ericsson; "Idle Gaps for Handover Measurements in E-Utran"; 3GPP TSG-RAN WG2 Meeting #56; R2-063227; XP-002470104; Nov. 6-10, 2006; pp. 1-6; Riga, Latvia.
Examination Report dated Nov. 29, 2018 issued in corresponding/related IN Application No. 2016/KOLNP/2013.
Extended European Search Report in corresponding European Application No. 17 168 510.0 dated Jul. 19, 2017.
Final Office Action, dated Jan. 23, 2019, from corresponding/related U.S. Appl. No. 15/062,703.
Final Office Action, dated Mar. 10, 2017, from corresponding/related U.S. Appl. No. 15/062,703.
International Search Report of The International Searching Authority in corresponding International Application No. PCT/SE2011/051044 dated Mar. 23, 2012.
Lucent Technologies; "Uplink Scheduling Requests for Real Time Services"; R2-062227; 3GPP TSG-RAN2 #54; Aug. 28-Sep. 1, 2006; 5 pages; Talinn, Estonia.
Nokia, "Additional RRM requirements for carrier aggregation," 3GPP TSG-RAN WG4 Meeting #57, R4-104311, Nov. 15-19, 2010, pp. 1-5, Jacksonville, FL.
NTT DoCoMo, Inc.; "Measurements for LTE Intra- Inter-RAT Mobility"; 3GPP TSG RAN WG2 #50; R2-060086; Jan. 9-13, 2006; pp. 1-5; Sophia Antipolis, France.
Office Action in Chinese Application No. 201180059746.4 dated Feb. 2, 2015; 9 pages.
Office Action in corresponding/related European Application No. 17 168 510.0 dated Oct. 22, 2019.
Office Action, dated Dec. 7, 2016, from corresponding/related U.S. Appl. No. 15/062,703.
Office Action, dated Jul. 24, 2018, from corresponding/related U.S. Appl. No. 15/062,703.
Office Action, dated May 31, 2018, from corresponding Chinese Application No. 2016101410214.4.
QUALCOMM Europe; "Measurement Gap Scheduling"; 3GPP TSG-RAN WG2 #54; R2-062359; Aug. 28-Sep. 1, 2006; pp. 1-3; Tallinn, Estonia.
Search Report, dated May 21, 2018, from corresponding Chinese Application No. 2016101410214.4.
Sharp; "Measurement Gap Control for E-UTRAN"; 3GPP TSG-RAN WG2#55; R2-062928; XP-002470106; Oct. 9-13, 2006; pp. 1-4; Seoul, Korea.
Written Opinion of The International Searching Authority in corresponding International Application No. PCT/SE2011/051044 dated Mar. 23, 2012.

EXCHANGE OF PARAMETERS RELATING TO MEASUREMENT PERIODS

CROSS-REFERENCE TO RELATED APPLICATIONS

This application is a continuation of U.S. patent application Ser. No. 16/502,142, filed Jul. 3, 2019, which is a continuation of U.S. patent application Ser. No. 15/062,703, filed Mar. 7, 2016, now U.S. Pat. No. 10,390,242, which is a continuation of U.S. patent application Ser. No. 13/377,180, filed Feb. 14, 2012, now U.S. Pat. No. 9,319,204, which is a National Stage of PCT Application No. PCT/SE2011/051044, filed Aug. 31, 2011, which is related to, and claims priority from, U.S. Provisional Patent Application Ser. No. 61/422,388 filed Dec. 13, 2010, the disclosure of which is incorporated here by reference.

TECHNICAL FIELD

The present disclosure relates generally to telecommunications systems, and in particular, to methods, systems, devices and software for exchanging measurement period related information in radio communications systems.

BACKGROUND

Radio communication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telephone System (UMTS) which is an existing third generation (3G) radio communication system that is evolving into High Speed Packet Access (HSPA) technology. Yet another alternative is the introduction of a new air interface technology in Evolution UMTS Terrestrial Radio Access Network (E-UTRAN), wherein Orthogonal Frequency Division Multiple Access (OFDMA) technology is used in the downlink and single carrier frequency division multiple access (SC-FDMA) in the uplink. In both uplink and downlink the data transmission is split into several sub-streams, where each sub-stream is modulated on a separate sub-carrier. Hence in OFDMA based systems, the available bandwidth is sub-divided into several resource blocks (RB) as defined, for example, in Third Generation Partnership Project (3GPP) TR 25.814: "Physical Layer Aspects for Evolved UTRA". According to this document, a resource block is defined in both time and frequency. A physical resource block size is 180 KHz and 1 time slot (0.5 ms) in frequency and time domains, respectively. The overall uplink and downlink transmission bandwidth in a single carrier of a Long Term Evolution (LTE) system can be as large as 20 MHz.

An E-UTRA system under single carrier operation may be deployed over a wide range of bandwidths, e.g. 1.25, 2.5, 5, 10, 15, 20 MHz, etc. As an example, a single carrier deployed over a 10 MHz bandwidth can include 50 resource blocks. For data transmission the network can allocate a variable number of resource blocks (RB) to the user equipment (UE) both in the uplink and downlink. This enables a more flexible use of the channel bandwidth. This because the channel bandwidth is allocated according to the amount of data to be transmitted, radio conditions, user equipment capability, scheduling scheme etc. In addition, the neighboring cells, even on the same carrier frequency, may be deployed over different channel bandwidths.

Multi-carrier, also known as the carrier aggregation (CA), refers to the situation where two or more component carriers (CC) are aggregated for the same user equipment. Carrier aggregation is considered for LTE-Advanced, such as Release 10 (Rel-10), in order to support wider bandwidths, i.e. bandwidths wider than 20 MHz. The use of carrier aggregation enables a manifold increase in the downlink and uplink data rate. For example, it is possible to aggregate different number of component carriers of possibly different bandwidths in the uplink (UL) and the downlink (DL).

Carrier aggregation thus allows the user equipment to simultaneously receive and transmit data over more than one carrier frequency. Each carrier frequency is generally called a component carrier. This enables a significant increase in data reception and transmission rates. For instance 2×20 MHz aggregated carriers would theoretically lead to two fold increase in data rate compared to that attained by a single 20 MHz carrier. The component carrier may be contiguous or non-contiguous. Furthermore, in case of non-contiguous carriers, they may belong to the same frequency band or to different frequency bands. This is often referred to as inter-band carrier aggregation. A hybrid carrier aggregation scheme comprising of contiguous and non-contiguous component carriers are also envisaged in LTE advanced.

In LTE advanced several contiguous and non-contiguous carrier aggregation scenarios are being considered. A scenario comprising 5 contiguous component carriers each of 20 MHz (i.e. 5×20 MHz) is considered for LTE Time Division Duplex (TDD). Similarly for LTE Frequency Division Duplex (FDD), a scenario comprising 4 contiguous component carriers each of 20 MHz, i.e. 5×20 MHz, in the downlink and 2 contiguous component carriers in the uplink is studied. It shall be understood that the number of component carriers that may be aggregated may be less than or greater than five. Thus, even more component carriers are possible to aggregate depending upon the availability of the spectrum.

In a carrier aggregation system (CA system) one of the component carriers in DL and in UL is designated as the primary carrier or primary CC (PCC), which is also termed as anchor carrier. The remaining CCs are termed as secondary CC (SCC). The primary carriers in the DL and UL may also belong to different bands in case of inter-band CA. The primary carriers generally carry the vital control and signaling information.

Typically the component carriers in carrier aggregation belong to the same technology, e.g. either all are of Wide Band Code Division Multiple Access (WCDMA) or LTE. However, carrier aggregation between carriers of different technologies is also possible to increase the throughput. Using carrier aggregation between carriers of different radio access technologies (RAT) is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and Code Division Multiple Access 2000 (CDMA2000) carriers. For the sake of clarity carrier aggregation within the same technology may be referred to as 'intra-RAT' or simply 'single RAT' carrier aggregation.

The network may configure one or more secondary component carriers (SCCs) for the user equipment supporting CA. Said one or more secondary component carriers may be configured using higher layer signaling, e.g. Radio Resource Control (RRC). The network may even configure such a user equipment in single carrier mode. The network may also de-configure any of the configured SCCs. The network may activate or de-activate any of the configured SCC anytime by using lower layer signaling e.g. by sending activation/deactivation command in the Medium Access Control (MAC). The user equipment is able to receive data on SCC which is activated. The user equipment saves its power by not receiving data on the deactivated SCC.

In radio communication systems various measurements are performed by the user equipment in support of a number of different network functions. Performing such measurements in new systems, such as those described above, raise various issues and challenges.

SUMMARY

An object is to improve performance of measurements performed by a user equipment served by a radio network node, such as an eNB, of a radio communication system, such as an LTE system.

According to an aspect, the object is achieved by a method in a first radio network node for enabling a second radio network node to determine a first parameter to be used by a user equipment for measuring at least one measurement quantity on a second cell. The first parameter relates to a first measurement period. The second cell is operated on a second carrier by the second radio network node and the second cell serves the user equipment. The first radio network node sends at least one parameter relating to the first measurement period to the second radio network node. In this manner, the first radio network node enables the second network node to determine the first parameter based on said at least one parameter.

According to another aspect, the object is achieved by a first radio network node for enabling a second radio network node to determine a first parameter to be used by a user equipment for measuring at least one measurement quantity on a second cell which serves the user equipment. The first parameter relates to a first measurement period. The first radio network node is configured to operate the second cell on a second carrier. The first radio network node comprises a transmitter configured to send at least one parameter relating to the first measurement period to the second radio network node, whereby the second radio network node is able to determine the first parameter based on said at least one parameter.

According to a further aspect, the object is achieved by a method in a second radio network node for providing a first parameter to be used by a user equipment for measuring at least one measurement quantity on a second cell. The first parameter relates to a first measurement period. The second radio network node operates the second cell on a second carrier. The second cell serves the user equipment. The second radio network node sends, to the user equipment, the first parameter and an indication indicative of the second carrier. The first parameter is determined based on a specific length of the first measurement period.

According to yet another aspect, the object is achieved by a second radio network node for providing a first parameter to be used by a user equipment for measuring at least one measurement quantity on a second cell. The first parameter relates to a first measurement period. The second radio network node is configured to operate the second cell on a second carrier. The second cell is configured to serve the user equipment. The second radio network node comprises a transmitter configured to send, to the user equipment, the first parameter and an indication indicative of the second carrier. The second parameter is determined based on a specific length of the second measurement period.

According to a still further aspect, the object is achieved by a method in a third network node for enabling a second radio network node to determine a first parameter to be used by a user equipment for measuring at least one measurement quantity on a second cell on a second carrier operated by the second radio network node. The first parameter relates to a first measurement period and the second cell serves the user equipment. The third network node sends at least one parameter relating to the first measurement period to the second radio network node, thereby enabling the second radio network node determine the first parameter based on said at least one parameter.

According to still another aspect, the object is achieved by a third network node for enabling a second radio network node to determine a first parameter to be used by a user equipment for measuring at least one measurement quantity on a second cell on a second carrier operated by the second radio network node. The first parameter relates to a first measurement period, and the second cell is configured to serve the user equipment. The third network node comprises a transmitter configured to send at least one parameter relating to the first measurement period to the second radio network node, thereby enabling the second radio network node determine the first parameter based on said at least one parameter.

According to a yet further aspect, the object is achieved by a method in a user equipment for measuring at least one measurement quantity on a second cell on a second carrier operated by a second radio network node. The user equipment is served by at least the second cell. The user equipment receives, from the second radio network node, an indication indicative of the second carrier and a first parameter to be used by the user equipment for measuring said at least one measurement quantity. The first parameter relates to at least a first measurement period. Moreover, the user equipment determines the first measurement period based on the first parameter. Next, the user equipment measures said at least one measurement quantity on at least the second cell on the second carrier over the first measurement period.

According to another still further aspect, the object is achieved by a user equipment for measuring at least one measurement quantity on a second cell on a second carrier operated by a second radio network node. The user equipment is configured to be served by at least the second cell. The user equipment comprises a receiver configured to receive, from the second radio network node, an indication indicative of the second carrier and a first parameter to be used by the user equipment for measuring said at least one measurement quantity. The first parameter relates to at least a first measurement period. Moreover, the user equipment comprises a processing circuit configured to determine the first measurement period based on the first parameter, wherein the processing circuit further is configured to measure said at least one measurement quantity on at least the second cell on the second carrier over the first measurement period.

Generally, embodiments herein provide a solution for exchange of parameters relating to measurement periods, such as the first measurement period. Since the second radio network node sends the indication indicative of the second carrier and the first parameter to the user equipment, the user equipment can apply the first parameter when performing measurements on the second carrier being indicated by the indication. In some examples, the first parameter may be adapted to deployment scenarios whereby the user equipment may obtain improved measurement performance thanks to the adapted first parameter. According to examples, in which the measurement quantity relates to measurement of the position of the user equipment, the user equipment may achieve improved positioning performance thanks to the first parameter.

An advantage is that the network, in particular the second radio network node or the third radio network node, is able to adequately determine an appropriate value of the parameter associated with the measurement period in different scenarios, such as deployment scenarios, network configurations, radio conditions and more.

A further advantage is that the user equipment is able to meet measurement requirements during handover or the like.

Yet another advantage is that the user equipment needs not to read system information (SI) of the target cell, such as a cell to which the user equipment is handed over, to obtain the parameter, or parameters, required for measurements. This results in a less complex user equipment.

According to exemplifying embodiments, a network node signals at least one parameter related to the measurement period of at least one measurement quantity to other network nodes. The receiving node, based on the received information, determines a common parameter associated with the measurement period to be used by the user equipment for performing measurement on one or more cells and signals the determined parameter to the user equipment.

According to one exemplifying embodiment, a method for exchanging measurement period related information in the first network node (e.g., a neighboring eNB) comprises: signaling to the second network node (e.g. a serving eNode B) at least one parameter ($\Psi$) related to the measurement period to be used by the user equipment for performing at least one measurement.

According to another exemplifying embodiment, a method for exchanging measurement period related information in a third network node (e.g. a centralized node such as SON) comprises: signaling to the second network node at least one parameter ($\Psi$) related to the measurement period to be used by the user equipment for performing at least one measurement.

According to another exemplifying embodiment, a method for exchanging measurement period related information in the second network node comprises: determining i) based on the received at least one parameter ($\Psi$) either from the first node or the third node and/or ii) based on the additional factors (e.g. deployment scenarios), the common parameter ($\Omega$) to be used by the user equipment for performing at least one measurement, signaling the determined parameter ($\Omega$) to the user equipment at the time of handover, and/or signaling the determined parameter ($\Omega$) further to other network nodes.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

The following detailed description of the exemplifying embodiments refers to the accompanying drawings. The same reference numbers in different drawings identify the same or similar elements. Also, the following detailed description does not limit the present disclosure. Instead, the scope of the embodiments is defined by the appended claims. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present disclosure. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
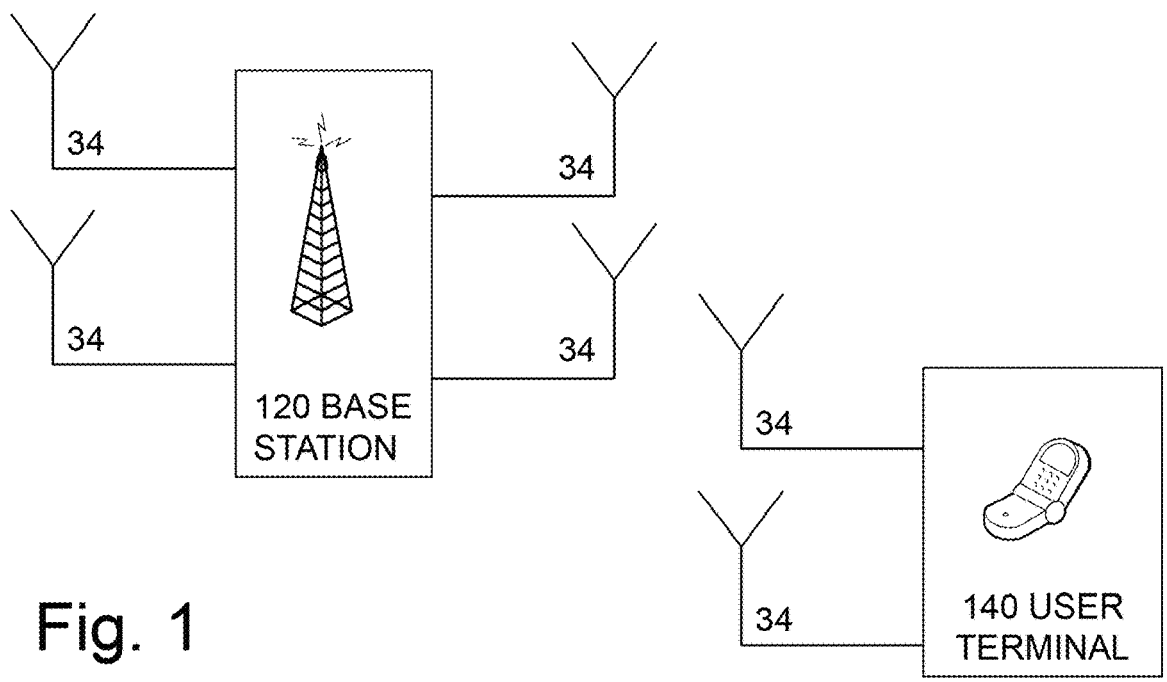
FIG. 1 shows a schematic overview of an exemplifying radio network node and an exemplifying user equipment in which exemplifying methods according embodiments herein may be implemented.
Figure 2:
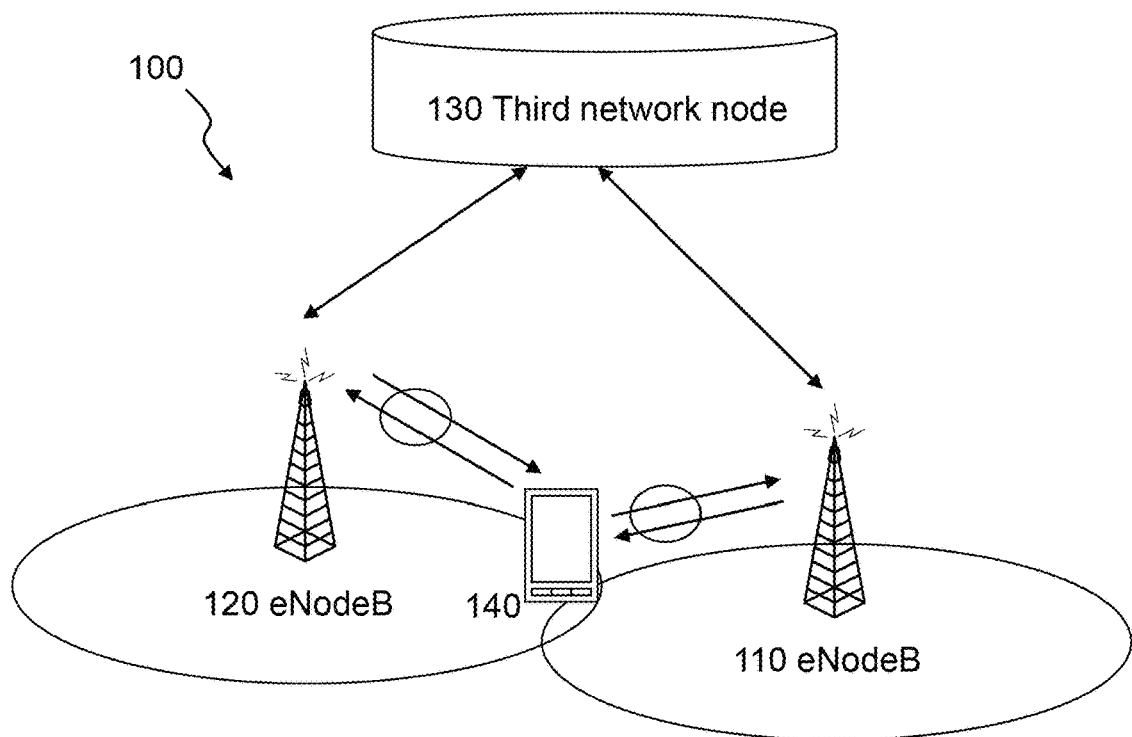
FIG. 2 shows a schematic overview of an exemplifying radio communication system in which exemplifying methods according embodiments herein may be implemented, FIGS. 3(a) and (b) show exemplifying aggregated carriers.

To provide some context for the following exemplifying embodiments related to uplink control signaling and reducing interference associated therewith, consider the exemplifying radio communication system as shown from two different perspectives in FIGS. 1 and 2, respectively. To increase the transmission rate of the systems, and to provide additional diversity against fading on the radio channels, modern wireless communication systems include transceivers that use multi-antennas, often referred to as a Multiple Input Multiple Output (MIMO) system. The multi-antennas may be distributed to the receiver side, to the transmitter side and/or provided at both sides as shown in FIG. 1.

More specifically, FIG. 1 shows a base station 120 having four antennas 34 and a user equipment 140, or user terminal, having two antennas 34. The number of antennas shown in FIG. 1 is exemplifying and is not intended to limit the actual number of antennas used at the base station 120 or at the user equipment 140 in the exemplifying embodiments to be discussed below.

Additionally, the term "base station" is used herein as a generic term. As will be appreciated by those skilled in the art, in the LTE architecture an evolved NodeB (eNodeB) may correspond to the base station, i.e., an eNodeB is a possible implementation of the base station. However, the term "eNodeB" is also broader in some senses than the conventional base station since the eNodeB refers, in general, to a logical node. The term "base station" is used herein as inclusive of a NodeB, an eNodeB or other nodes specific for other architectures. An eNodeB in an LTE system handles transmission and reception in one or several cells, as shown for example in FIG. 2.

FIG. 2 shows an exemplifying radio communication system 100, such as an LTE system 100. The LTE system 100 of FIG. 2 shows the radio communication system of FIG. 1 in more detail.

A first and a second eNodeB 110, 120 are comprised in the LTE system 100. The first and second eNodeBs 110, 120 are neighbors to each other. In some examples, the second eNodeB is configured to operate a first cell, such as a PCell, on a first carrier. The second eNodeB 120 is configured to operate a second cell, such as an SCell, on a second carrier. In some examples, the first eNodeB 110 is configured to operate a third cell on the second carrier. PCell and SCell are known from 3GPP terminology. It shall here be noted that each of the antennas of the base station 120 in FIG. 4 correspond to a respective cell. In the present scenario, the first and second cells correspond to a first and a second antenna of the radio base station 120 in FIG. 4.

A user equipment 140 is also shown in FIG. 2. The user equipment 140 uses dedicated channels 40 to communicate with the eNodeB(s) 110, 120, e.g., by transmitting or receiving Radio Link Control Protocol Data Unit (RLC PDU) segments as according to exemplifying embodiments described below. The user equipment 140 is served by the second cell. In some embodiments, the user equipment 140 is also served by the first cell which is configured to enable exchange of control information between the first cell and the user equipment 140. In some embodiments as exemplified above, the first cell may be a PCell and the second cell may be an SCell. The user equipment 140 may be a mobile phone, a cellular phone, a Personal Digital Assistant (PDA) equipped with radio communication capabilities, a smartphone, a laptop equipped with an internal or external mobile broadband modem, a portable electronic radio communication device, a Machine Type Communication (MTC) device or the like.

Furthermore, the LTE system 100 comprises a third network node 130, such as an E-SMLC, O&M or the like.

Having described some exemplifying LTE devices in which aspects of exchange of measurement period related information according to exemplifying embodiments can be implemented, the discussion now returns to consideration of measurements in the context of carrier aggregation.

Figure 3A:
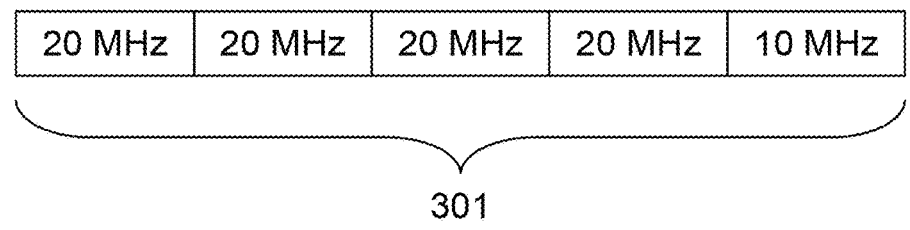
Figure 3B:
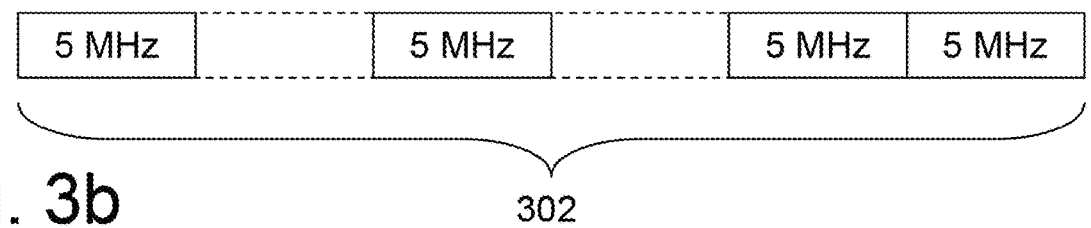

In FIGS. 3(a) and (b), exemplifying block diagrams of aggregated carriers are shown. As shown in FIG. 3(a), an exemplifying aggregated bandwidth, or aggregated carrier 301, of 90 MHz can be achieved by using 4 (four) 20 MHz carriers and one 10 MHz, all of which are contiguous, i.e. neighboring to each other. In some examples, as shown in FIG. 3(b), an exemplifying aggregated bandwidth, or an aggregated carrier 302, of 20 MHz can be achieved by using 4 (four) 5 MHz carriers, some of which are contiguous while others are not. That is to say carriers that are not contiguous are not neighboring to each other as seen in FIG. 3(b), i.e. some carriers between any of the four carriers making up the aggregated carrier 302 are not part of the aggregated carrier.

With reference to measurements in the context of carrier aggregation, the measurements are performed by the user equipment on the serving, as well as on neighbor, cells over some known reference symbols or pilot sequences. Some measurements may also require the user equipment to measure the signals transmitted by the user equipment in the uplink. In a multi-carrier or carrier aggregation scenario, the user equipment may perform the measurements on the cells on the primary component carrier (PCC) as well as on the cells on one or more secondary component carriers (SCCs). The measurements are done for various purposes. Some example measurement purposes are: mobility, positioning, self organizing network (SON), minimization of drive tests (MDT), operation and maintenance (O&M), network planning and optimization etc.

Such measurements are typically performed over a time duration on the order of a few 100 ms to a few seconds. The same measurements are applicable in single carrier and CA modes. However in carrier aggregation the measurement requirements may be different. For example the measurement period may be different in CA, e.g. it can be either relaxed or more stringent depending upon whether the SCC is activated or not. This may also depend upon the user equipment capability i.e. whether a CA capable user equipment is able to perform measurements on SCC with or without gaps. Some examples of mobility measurements in LTE systems include: reference symbol received power (RSRP) and reference symbol received quality (RSRQ). Examples of mobility measurements in HSPA are: common pilot channel received signal code power (CPICH RSCP) and CPICH Ec/No. The mobility measurement may also be used to identify a cell in LTE, High Speed Packet Access (HSPA), Code Division Multiple Access 2000 (CDMA2000), Global System for Mobile Communications (GSM), etc. Examples of positioning measurements in LTE are: reference signal time difference (RSTD) and UE reception-transmission (RX-TX) time difference measurement. The UE RX-TX time difference measurements requires the user equipment to perform measurements on the downlink reference signal as well as on the uplink signals. Example of other measurements which may be used for MDT, SON or for other purposes are: control channel failure rate or quality estimate e.g. paging channel failure rate, broadcast Channel failure rate, physical layer problem detection e.g., out of synchronization (out of sync detection, in synchronization (in-sync detection, and radio link monitoring. The exemplifying embodiments described herein are applicable to all of these measurement types, but are not limited to these.

In LTE release 10 the measurements on the SCC are performed by the CA capable user equipment by using the following principles:

1) Non-configured SCC: The measurements are done using measurement gaps on SCC which are not configured by the network.

2) Configured and Activated SCC: The measurements are done without measurement gaps on SCC which are configured and activated by the network. This means measurement requirements corresponding to the intra-frequency (i.e. serving carrier) or which are similar to those for the intra-frequency apply to the SCC which is configured and activated.

3) Configured and De-activated SCC: The measurements are done without measurement gaps on SCC which are configured and de-activated by the network. However, to enable user equipment power saving the measurement requirements for the configured and de-activated SCC are less stringent compared to those specified for the intra-frequency (i.e. serving carrier).

In case of 3) it has been proposed that the measurement period should be configurable in the range of 800 ms to 6400 ms for performing RSRP/RSRQ measurements on an SCC which is configured and de-activated. The measurement period for the cell identification is much longer than that of RSRP/RSRQ.

Therefore, as disclosed by embodiments herein, a parameter for indication of a duration of the measurement period can be different for different measurements or common for more than one type of measurement. The parameter can be user equipment specific or common for all UEs in a cell. The parameter can also be specific to each secondary or inter-frequency carrier or common for all carriers or for a group of carriers. The carrier aggregation can be used in different deployment scenarios e.g. indoor, outdoor etc. Similarly, different types of antenna configuration may be used for different component carriers. Furthermore, different component carriers may belong to different frequency bands, which may be associated with different coverage. For example, two component carriers, belonging to frequency bands 900 MHz and 2.6 GHz, respectively, may generate coverage areas, which have a coverage difference in the order of 7-8 dB. Therefore, in scenarios involving different deployment environments, system configurations and/or frequency characteristics of component carriers, it is preferred that the parameter is specific to each component carrier rather than the parameter is common for all or for a group of carriers.

Thus, according to embodiments where different parameters are used for different cells, a further parameter is only used by the user equipment for performing measurements on the neighboring cells. This is in contrast to the parameter first mentioned, which is based only on the serving node, i.e. not on exchange of information over X2 in LTE, and which can be used for performing measurement only on the serving cell. This means the user equipment uses the serving node specific parameter for performing serving cell measurements. In case of CA, the further parameter) can be used by the user equipment for performing measurements on the neighboring cells on the SCC. In case of CA, the parameter can be used by the user equipment for performing measurements on the serving cell on the SCC. The rationale is that neighboring cells may have different deployment scenario or radio environment requiring different parameter value compared to that used in the serving cell. Thus according to this arrangement two sets of parameters, i.e. serving cell specific and neighbor cell specific, can be signaled to the user equipment. Furthermore, each of the serving cell specific parameter and the neighbor cell specific parameter can still be common to all UEs in a cell or specific to one user equipment or can be specific to each secondary/inter-frequency carrier or any combinations thereof.

Returning to embodiments where the same parameters are used for different cells, i.e. parameter is a common parameter in the sense that the parameter is common to different cells. This may be beneficial when deployment scenarios, system configurations and/or frequency characteristics of component carriers for different cells are similar or equal. Advantageously, only one parameter, i.e. the common parameter, needs to be signaled in the network in comparison to the scenario described in the paragraph directly above.

Figure 4:
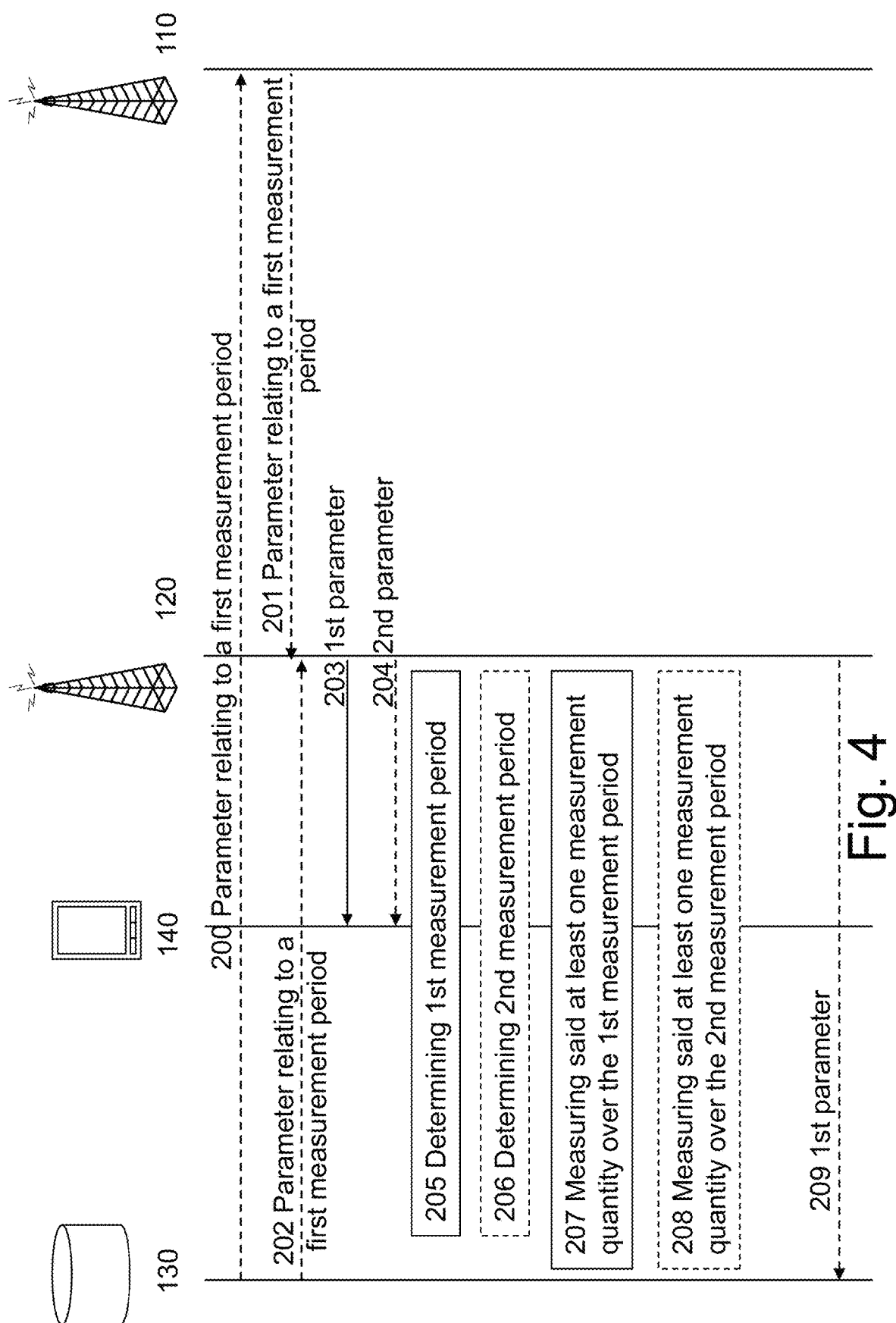
FIG. 4 shows a schematic, combined signaling and flow chart of exemplifying methods performed in the radio communication system according to FIG. 2.

FIG. 4 shows a combined signaling and flow chart of exemplifying methods performed by the first, second and third network nodes in FIGS. 1 and 2. The first radio network node 110 may perform a method for enabling the second radio network node 120 to determine a first parameter to be used by the user equipment 140 for measuring at least one measurement quantity on the second cell. As an example, the measurement quantity may be a position or a positioning measurement value used for determining the position. The second radio network node 120 may perform a method for providing the first parameter to be used by the user equipment 140 for measuring at least one measurement quantity on the second cell. The third network node 130 may perform a method for enabling the second radio network node 120 to determine the first parameter to be used by the user equipment 140 for measuring at least one measurement quantity on the second cell on the second carrier operated by the second radio network node 120. The user equipment 140 may perform a method for measuring at least one measurement quantity on the second cell on the second carrier operated by the second radio network node 120. More generally, the user equipment may perform a method for determining a first parameter to be used by the user equipment for measuring said at least one measurement quantity on the second cell. As mentioned, the user equipment 140 is served by said at least one second cell. Again, the first parameter relates to a first measurement period. As an example, the first parameter may be one of a set of parameters designated for use as indications of measurement periods. The set of parameters may be predefined, such as given by a specification.

According to embodiments, in which the first radio network node 110 operates the third cell on the second carrier, the first parameter further is to be used by the user equipment 140 for measuring said at least one measurement quantity on the third cell. Thus, the first parameter is common for at least the second cell and the third cell. In this embodiment, the first parameter may be common to all cells on which the user equipment is instructed to measure.

In some embodiments, said at least one parameter relating to the first measurement period comprises one or more of:
The first parameter to be used by the user equipment 140,
One or more measurement period related parameters received from one or more radio network nodes neighboring to the second radio network node 120,
One or more factors relating to deployment.

In addition to the parameter values used, or assigned, in said one or more radio network nodes, such as the first radio network node, other factors may also influence determination of the value of the parameter. The factors may be deployment related factors, e.g. said one or more factors relating to deployment. Examples of such factors relating to deployment, or deployment scenarios, are:

user equipment power consumption, i.e. power consumption of the user equipment

Type of measurement quantity

Type of service (e.g. whether measurement is for emergency call)
    For measurements for the emergency calls, e.g. Observed Time Difference Of Arrival (OTDOA), Reference Time Difference (RSTD) in LTE the measurement period should be smaller to ensure the emergency call is furnished quickly.

Cell size
    If cell size is large then received signals may be weak and the user equipment may need more time to measure cells.

Number of cells to measure.
    Longer measurement period is desired if there are more cells in order to reduce the user equipment processing.

Radio conditions and environment e.g. delay spread, user equipment speed/Doppler etc.
    Longer measurement period in case of longer delay spread and/or larger speed.

Whether user equipment is in DRX or not or whether the DRX is long (e.g. 1.28 second) or short (e.g. 40 ms) etc. For example when DRX is used a longer measurement period can be achieved with larger value of the parameter to enable user equipment power consumption.

When said at least one parameter comprises, or is, the first parameter, the second radio network node 120 forwards the first parameter to the user equipment 140. See action 201, 202 and 203.

As an example, said one or more measurement period related parameters are one or more of the parameters in the set of parameters designated for use as indications of measurement periods. Said one or more of the parameters in the set of parameters have been mentioned above in conjunction with first paragraph about FIG. 4. Each of said one or more parameters has been assigned for use when the user equipment measures towards a respective radio network node of said one or more radio network nodes. As mentioned in conjunction with third paragraph about FIG. 4 second bullet, said one or more radio network nodes are neighboring to the second radio network node 120.

In some embodiments of the method, said at least one measurement quantity relates to positioning measurements used for determining a position of the user equipment 140. As an example, said at least one measurement quantity is a position determined during a positioning session. As another example, said at least one measurement quantity is a measurement value used for determining a position during a positioning session. In some examples, said at least one measurement quantity is RSRP, RSTD or RSRQ.

The following actions may be performed. Notably, in some embodiments of the method the order of the actions may differ from what is indicated below.

Action 200

In some embodiments, the first radio network node 110 receives and the third network node 130 sends said at least one parameter relating to the first measurement period. In this embodiment, the third network node may be a node managing said at least one parameter for a plurality of radio network nodes, such as the first radio network node 110. In this manner, a set of parameters relating to the first measurement period may be applied to said plurality of radio network nodes. Thus, the set of parameters may be centrally determined by the third network node 130.

Action 201

The first radio network node 110 sends at least one parameter relating to the first measurement period. In some embodiments, the second radio network node 120 receives said at least one parameter relating to the first measurement period from the first radio network node 110. In this manner, the second radio network node 120 is able to determine the first parameter based on said at least one parameter.

Action 202

In some embodiments, the third network node 130 sends and the second radio network node 120 receives said at least one parameter. When the third network node 130 sends said at least one parameter, said at least one parameter may be distributed to one or more radio network nodes. Said one or more radio network nodes may be neighbors to the second radio network node.

Action 203

The second radio network node 120 sends and the user equipment 140 receives the first parameter and an indication indicative of the second carrier. The first parameter is determined based on a specific length of the first measurement period. As explained below a longer measurement period reduces power consumption of the user equipment. Thus, in some scenarios it may be desired to employ a long measurement period in order to make the user equipment consume less power. Hence, the specific length of the first measurement period should be set such that a long duration is obtained, e.g. a relatively high value of the duration. In this manner, it may for example be avoided that the user equipment runs out of battery. In addition, reduced power consumption of the user equipment may yield reduced interference to other devices, humans and/or animals located nearby the user equipment.

According to embodiments, in which said at least one parameter comprises one or more measurement period related parameters, the first parameter is determined as one of:
    the maximum of said one or more measurement period related parameters,
    the minimum of said one or more measurement period related parameters,
    the arithmetic mean of said one or more measurement period related parameters,
    the geometric mean of said one or more measurement period related parameters, and the like.

In general, according to an exemplifying embodiment, the determined parameter for measurement quantity #1 ($\Omega 1$), such as said at least one measurement quantity, is a function of received information, such as parameters relating to the first measurement period:

$$\Omega 1 = F(\Psi 11, \Psi 12, \ldots, \Psi 1N) \qquad (2)$$

where $\Psi 1N$ is the parameter related to measurement period of the measurement quantity #1 and is received from the first node #N. A more generalized expression can be:

$$\Omega 1 = F(\alpha 11 * \Psi 11, \alpha 12 * \Psi 12, \ldots, \alpha 1N * \Psi 1N) \qquad (3)$$

In the following some examples of specific rules, or formulas, which can be used for determining the parameter at the second node, are presented. Examples of such rules are:

Maximum measurement period: The parameter which is the maximum of all the received values. This leads to longer measurement period and is thus more suitable for user equipment power saving.

$$\delta 1 = \text{Max}(\Psi 11, \Psi 12, \ldots, \Psi 1N) \qquad (4)$$

Minimum measurement period: The parameter which is the minimum of all the received values. This leads to shorter measurement period and thus leads to faster measurement but increases user equipment power consumption and processing.

$$\Omega 1 = \text{Min}(\Psi 11, \Psi 12, \ldots, \Psi 1N) \qquad (5)$$

Mean measurement period: The parameter which is the mean of all the received values. This is a compromise between the user equipment power consumption and the measurement performance. The means can be arithmetic mean (Eq. 6), geometric mean or based on the weighted average (Eq. 7).

$$\Omega 1 = \text{Mean}(\Psi 11, \Psi 12, \ldots, \Psi 1N) \qquad (6)$$

$$\delta 1 = \text{Mean}(\alpha 11 * \Psi 11, \alpha 12 * \Psi 12, \ldots, \alpha 1N * \Psi 1N) \qquad (7)$$

Action 204

In some embodiments, the second radio network node 120 sends and the user equipment 140 receives a second parameter to be used by the user equipment 140 for measuring said at least one measurement quantity on the third cell. The second parameter relates to a second measurement period and the second parameter is determined based on the specific length of the second measurement period.

Action 205

In some embodiments, the user equipment 140 determines the first measurement period based on the first parameter. For example, the user equipment uses a table to map the first parameter to a value (in a time unit, such as ms) of a measurement period. Possibly also a multiplying factor is applied depending on the measurement quantity. As an example, a first measurement quantity may be associated with a multiplying factor of two while a second measurement quantity may be associated with a multiplying factor of five. In this manner, both the first and second measurement quantity are related to the value obtained by the user equipment by the use of for example the table mentioned above.

Action 206

In some embodiments, the user equipment 140 determines the second measurement period based on the second parameter. For example, the user equipment uses a table to map the second parameter to a value of a measurement period. As an example, the value of the measurement period may be expressed in a time unit such as ms. Possibly, also a multiplying factor is applied depending on the measurement quantity. The second parameter may also be one of the parameters of the set of parameters available to the first parameter.

The following holds for the first and second parameter, but for reasons of simplicity the description is written for the first parameter.

The first parameter is used by the user equipment in particular for deriving the first measurement period of a measurement which is performed over any SCC or SCell but in particular over a SCC or SCell which is deactivated by the network. Again, it may be noted that the SCC or SCell are examples of the second cell. The first parameter can also be used by the user equipment for deriving the first measurement period of a measurement quantity performed on any other cells of the carrier including the serving cell, reference cell etc. As an example the user equipment can derive, or determine, the measurement period based on the received first parameter by using the following expression:

$$T_1 = \mu \times \Omega_1 \qquad (1)$$

where $T_1$, $\mu$ and $\Omega_1$ are the measurement period, a constant or pre-defined value and the received parameter, respectively. The first parameter $\Omega_1$ is signaled by the serving node to the user equipment for performing measurement of measurement quantity #1. In one purely illustrative example $\mu$ and $\Omega_1$ can be 5 and 200 ms, respectively, for RSRP and RSRQ. This results in $T_1$ being equal to 1000 ms. In another example $\mu$ and $\Omega_1$ can be 20 and 200 ms respectively for cell identification in LTE. This results in $T_1$ being equal to 4 s.

Action 207

In some embodiments, the user equipment 140 measures said at least one measurement quantity on at least the second cell on the second carrier over the first measurement period.

In some embodiments, the measuring further comprises measuring said at least one measurement quantity on the third cell on the second carrier over the first measurement period.

Action 208

In some embodiments, the user equipment 140 measures said at least one measurement quantity on the third cell on the second carrier over the second measurement period.

As mentioned above, the determined parameter, such as the first and second parameter, can be different for different measurements or common for more than one type of measurement. The parameter can be user equipment specific or common for all UEs in a cell. The parameter can also be specific to each secondary or inter-frequency carrier or common for all carriers or for a group of carriers. The carrier aggregation can be used in different deployment scenarios e.g. indoor, outdoor etc. Similarly, different types of antenna configuration may be used for different component carriers. Furthermore, different component carriers may belong to different frequency bands, which may be associated with different coverage. For example, two component carriers, belonging to frequency bands 900 MHz and 2.6 GHz, respectively, may generate coverage areas, which have a coverage difference in the order of 7-8 dB. Therefore, in scenarios involving different deployment environments, system configurations and/or frequency characteristics of component carriers, it is preferred that the parameter is specific to each component carrier rather than the parameter is common for all or for a group of carriers.

Thus, also as mentioned above, according to embodiments where different parameters are used for different cells, the second parameter, previously referred to as the further parameter, is only used by the user equipment for performing measurements on the neighboring cells. This is in contrast to the first parameter, which is based only on the serving node, i.e. not on exchange of information over X2 in LTE, and which can be used for performing measurement only on the serving cell. This means the user equipment uses the serving node specific parameter for performing serving cell measurements. In case of CA, the common parameter (i.e. second parameter or the further parameter) can be used by the user equipment for performing measurements on the neighboring cells on the SCC. In case of CA, the first parameter can be used by the user equipment for performing measurements on the serving cell on the SCC. The rationale is that neighboring cells may have different deployment scenario or radio environment requiring different parameter value compared to that used in the serving cell. Thus according to this arrangement two sets of parameters (serving cell specific and neighbor cell specific can be signaled to the user equipment. Furthermore each of serving cell specific parameter or neighbor cell specific parameter can still be common to all UEs in a cell or specific to one user equipment or can be specific to each secondary/inter-frequency carrier or any combinations thereof.

Action 209

In some embodiments, the second radio network node 120 sends and the third network node 130 receives the first parameter. Thereby, the third network node 130 may distribute the first parameter to further radio network nodes, such as the first and second radio network nodes 110, 120.

Figure 5:
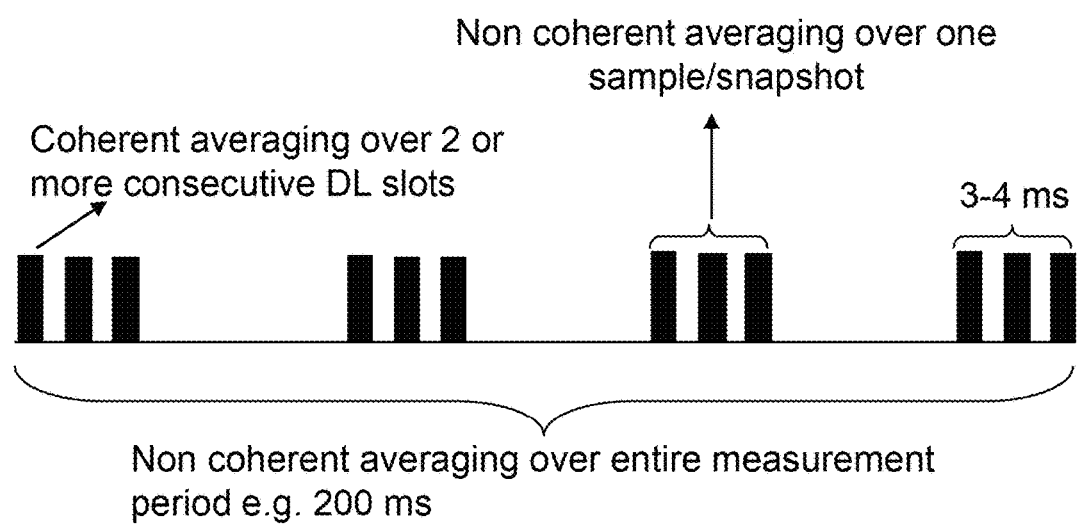
FIG. 5 shows example of an RSRP measurement period.

An example of an RSRP measurement period is shown in FIG. 5. The measurement period is also interchangeably called an L1 measurement period, physical layer period or interval, L1 measurement interval, L1 or physical layer duration etc. The user equipment is required to meet the performance requirements of the user equipment measurement quantity over this period. Examples of measurement periods are: in LTE the user equipment has to meet accuracy of Evolved-UMTS Terrestrial Radio Access (EUTRA) intra-frequency RSRP measurement over the measurement period=200 ms without Discontinuous Reception (DRX), the user equipment has to identify an E-UTRA intra-frequency cell in a duration or measurement period of 800 ms, another example is that of the duration to acquire the system information (i.e. reading of MIB and one or more SIB) of the cell, and yet another example is that of the duration (e.g. 150 ms in LTE) to acquire the cell global ID (CGI) or evolved CGI of the cell.

To ensure measurement accuracy of the measurement quantity, the user equipment needs to collect a number of measurement samples at regular interval over a measurement period. For instance in a measurement period of 200 ms it will most likely obtain 3 or 4 samples for measuring RSRP or RSRQ in LTE. The overall measurement quantity result would comprise of the average of all these samples i.e. average of 3-4 samples over 200 ms period. Furthermore each measurement sample typically comprises of two types of averages:

Coherent averaging

Non-coherent averaging Coherent averaging is performed over a duration in which the radio channel characteristics remain unchanged or variation is quite trivial. Optimal coherent averaging would depend upon a particular channel as it depends upon the coherence bandwidth of the channel. Typically the coherent averaging is performed over 2-4 consecutive downlink slots (e.g. 1-2 ms) depending upon the channel type. For implementation the user equipment may use the same number of consecutive slots (e.g. 3 slots) irrespective of channel behavior.

The non-coherent averaging is performed using samples which are uncorrelated from the perspective of radio channel characteristics. In fact the basic non-coherent sample would comprise 2 or more coherently averaged samples. The overall measurement quantity results comprises of non-coherent averaging of 2 or more basic non-coherent averaged samples. If the measurement period is longer e.g. 800 ms, then the user equipment may still use the same number of samples as used in a period of 200 ms but in the former case they will be sparser in time. This enables the user equipment to save its battery as it has to wake up less frequently.

In E-UTRAN systems, during handover, which takes place in active mode, all necessary system information related to the target cell is provided to the user equipment in the handover command. This shortens the handover interruption. The user equipment can reconfigure lower layers based on target cell configurations without reading the system information of the target cell. In prior art system until release 9, the measurement period used by the user equipment for performing mobility or any other measurements is pre-defined in the standard. In other words no parameter related to the measurement period of a measurement quantity is signaled to the user equipment.

In carrier aggregation systems in LTE Rel-10, it has been proposed that the serving cell (i.e. PCell) signals the measurement period related parameter to the user equipment via higher layer signaling. The user equipment uses this for deriving the measurement period for performing mobility measurements on the deactivated secondary component carriers (or SCells). The measurements include SCells' identification, RSRP and RSRQ. However different network nodes (e.g. base station, eNode B, relay node etc) due to different deployment scenarios may require different measurement periods. It is not, however, specified how an appropriate value of the parameter is derived. It is also not known how the parameter is derived and provided to the user equipment in case of positioning measurements. The positioning measurements are configured by the positioning node, e.g. an Evolved-Serving Mobile Location Center (E-SMLC) in LTE.

According to exemplifying embodiments, each network node signals at least one parameter related to the measurement period of at least one measurement quantity to other network nodes. The receiving node based on the received information determines the common parameter associated with the measurement period to be used by the user equipment for performing measurement on one or more cells. The receiving node signals the determined parameter to the user equipment.

According to one exemplifying embodiment, a method for exchanging measurement period related information in the first network node (e.g., a neighboring eNB) comprises: signaling to the second network node (e.g. a serving eNode B) at least one parameter ($\Psi$) related to the measurement period to be used by the user equipment for performing at least one measurement.

According to another exemplifying embodiment, a method for exchanging measurement period related information in a third network node (e.g. a centralized node such as SON) comprises: signaling to the second network node at least one parameter ($\Psi$) related to the measurement period to be used by the user equipment for performing at least one measurement.

According to another exemplifying embodiment, a method for exchanging measurement period related information in the second network node comprises: determining i) based on the received at least one parameter ($\Psi$) either from the first node or the third node and/or ii) based on the additional factors (e.g. deployment scenarios), the common parameter ($\Omega$) to be used by the user equipment for performing at least one measurement, signaling the determined parameter ($\Omega$) to the user equipment at the time of handover, and/or signaling the determined parameter ($\Omega$) further to other network nodes.

Exemplifying embodiments thus enable the serving network node to configure the most suitable parameter associated with the measurement period of the measurement quantity or which can be used by the user equipment for deriving the measurement period of the measurement quantity. Examples of measurements are given above and may include, for example, radio measurements (e.g. CPICH RSCP, RSRP, RSTD, RSRQ etc), timing related measurements (e.g. user equipment round trip time (RTT), user equipment Rx-Tx time difference etc), cell identification to identify PCI or CGI, acquisition of system information etc.

According to one exemplifying embodiment, the serving network node (e.g. eNB in LTE) can signal two values of a parameter or 2 separate parameters (i.e., a first parameter and a second parameter) to the user equipment for deriving the measurement period of a measurement quantity. The first parameter can be used for performing measurement on serving cell (or on serving cell operating on SCC in CA) and the second parameter can be used for performing measurement on the neighboring cells (or neighbor cells operating on SCC in CA). The two distinct sets of parameters or 2 values are particularly useful in case the serving node and neighboring nodes are used in different deployment scenarios (e.g. radio conditions, cell size, user equipment speed etc). This means the value of the second parameter which is common for all neighbor nodes can be different compared to that of the first parameter. As a special case they can be the same e.g. when deployment scenario of all or most nodes is homogeneous.

In a distributed method according to one exemplifying embodiment, a first node signals the parameters used in the first node to a second node. In this embodiment, the first node is generally a neighboring node, and the second node is the serving node, which requests the user equipment to perform the measurements and hence signals the parameter associated with the measurement period of the measurement. Examples of the first node are eNode B, Node B, donor base station (donor BS), Donor eNode B. Examples of the second node are serving eNode B, base station, relay node, positioning node (e.g. E-SMLC), Radio Network Controller (RNC), Base Station Controller (BSC), etc.

Figure 6:
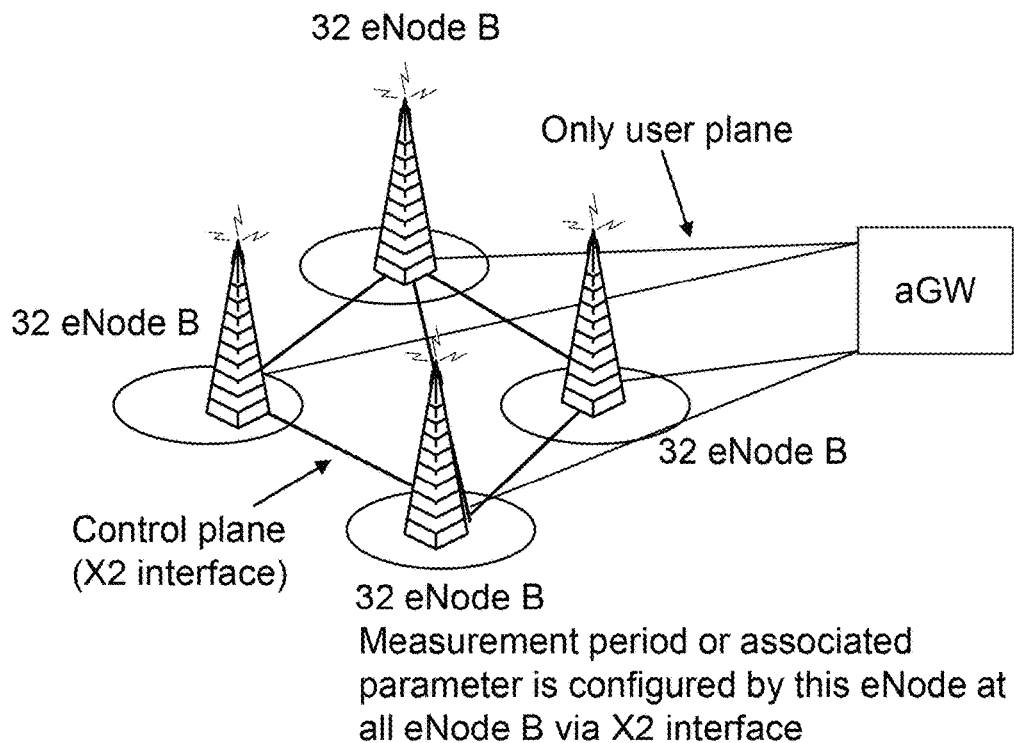
FIG. 6 shows an exemplifying radio communication system.

In this method each serving node (e.g. eNode B or base station) receives the necessary information or parameter associated with the measurement period of at least one measurement quantity (e.g. RSRP) from one or more first nodes (e.g. target eNode B). The parameter can be specific to each measurement quantity or can be common for more than one measurement quantities (e.g. same for the measurement periods of RSRP, RSRQ and cell identification). Furthermore the parameter can be specific to each carrier on which the measurement is to be performed by the user equipment or can be common for more than one carrier or more than on CCs in CA system. The parameter can thus be termed as the measurement period parameter value or L1 period parameter value etc. In LTE each eNode B would receive the information or the value of the parameters from all or sub-set of eNode Bs in a particular coverage area. In this case the parameter can be signaled over an eNode B-eNode B interface (i.e. X2 interface) as shown in FIG. 6.

For positioning measurements in LTE, the second node is the positioning node (i.e. E-SMLC) which receives the parameter associated with the measurement period of the positioning measurement (e.g. RSTD) from the neighboring eNode Bs. In this case the parameter is signaled using LTE Positioning Protocol Annex (LPPa) protocol over S1 and SLs interfaces between eNB and E-SMLC. The parameter may also be signaled to the positioning node via core network, e.g. via Mobility Management Entity (MME) to the E-SMLC in LTE. The core network may first acquire the parameter either from radio network nodes (e.g. from eNB over S1 interface) or from any other centralized network node. The first node can either signal the above mentioned parameter to the second node proactively or upon the receiving requests from the second or any other node e.g. third node. Furthermore, the parameter can be provided to the second node either any time or at specific occasions like when the first node and/or second node is initially setup or reconfigured or upgraded or modified or when new features are added or removed.

The second node, upon receiving parameters associated with the measurement periods of one or more measurement from other nodes (i.e. first nodes), determines the parameter, which it signals to the user equipment. The received parameter values can be considered as the recommended values from the other nodes. The determined parameter by the second node can be common for performing measurement on more than one cell including serving cell and neighboring cell.

According to another embodiment, the parameter can be different for different cells. In this case the parameter is to be associated with the cell identifier. This means serving node B receives the parameter values used in neighboring nodes (Ns) and signals the received values of the parameters to the user equipment for performing the measurements on some of these neighboring nodes (Nc ⊂ Ns). This method indicates that the serving node signals the neighbor cell list which would increase signaling overheads. But this solution is most optimal in case cells in a heterogeneous deployment scenario.

According to another embodiment, the serving node uses the acquired measurement period parameter values from the neighboring nodes, and deployment related factors to determine the value of the parameter to be used for signaling to the user equipment.

$$\Omega_1 = F(\Psi_{11}, \Psi_{12}, \ldots, \Psi_{1N}, \mu_{11}, \ldots, \mu_{1M}) \quad (8)$$

where $\mu_{1M}$ is the $M^h$ factor influencing the parameter related to measurement period of the measurement quantity #1. For example the network node (second node) can use the mean value (rule based on Eq. 7) to derive the initial value of the parameter. But in addition, if the user equipment is in DRX, then it may slightly increase the value of the parameter by an offset. On the other hand if there is an emergency call then the value of the parameter can be shortened compared to that of the mean value.

According to another exemplifying embodiment, in a centralized method the third node signals the recommended value of the parameter for one or more measurement quantities to the second node. Examples of third nodes are: donor base station or donor Node B or donor eNode B serving relays, SON node, Operation and Maintenance (O&M) node, Operations Sub-System (OSS) node, operation and maintenance node, core network node (e.g. MME in LTE) etc. Examples of second nodes as quoted earlier are: BS, RNC, BSC, eNode B, positioning node (e.g. E-SMLC in LTE), relay node etc. As earlier the second node is the serving node which requests the user equipment to perform measurements and thus sends the value of the measurement period parameter for doing these measurements. The receiving nodes (second nodes) follow the recommended measurement period parameter values acquired from the third node. Hence the third node is considered to be the centralized node. In another variant the second node may further modify the recommended value of the parameter before signaling this to the user equipment or to other nodes. This could be regarded as partially centralized or semi-distributed.

Figure 7:
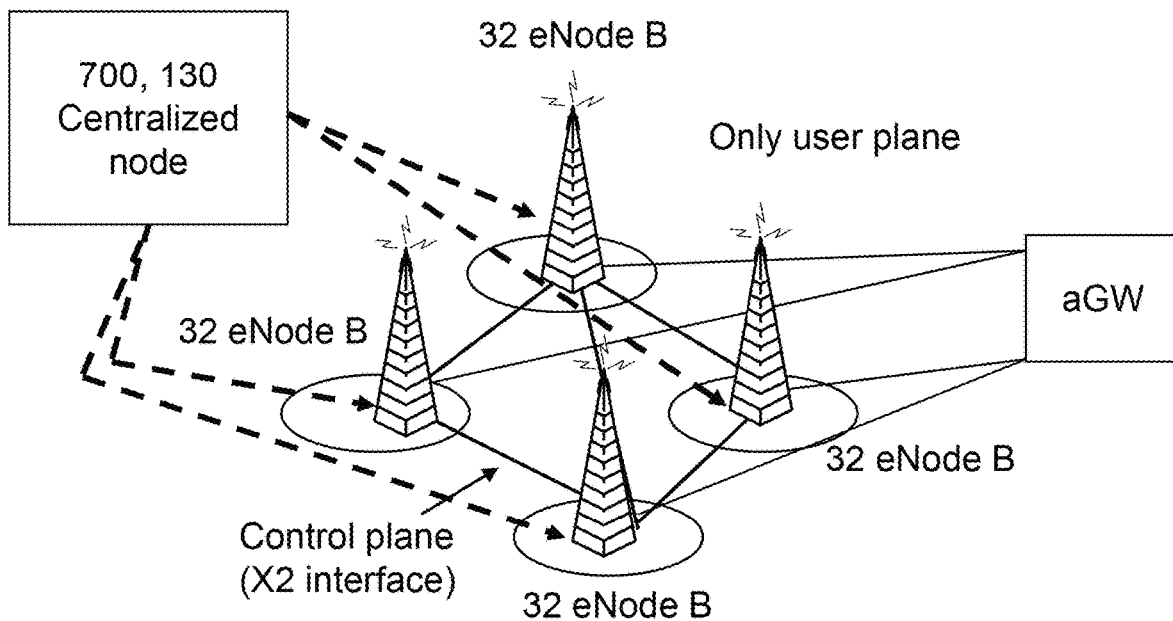
FIG. 7 shows another exemplifying radio communication system.

The third node uses any of the principles described above to determine the recommended value of the measurement period parameter. For example it can acquire information from the second node or from other nodes (e.g. core network) to find the most suitable values of the parameters to be used in different set of second modes. The third node may signal the parameters to the second node proactively or upon the receiving requests from the second or receiving request from another third node (e.g. by core network). Furthermore the parameter can be provided to the second node either any time or at specific occasions like when the second node is setup or reconfigured or upgraded or modified. An example of a third node (centralized node) 700, 130 configuring the second node (eNode B) in over third node eNode B interface in LTE is illustrated in FIG. 7. Therein, the O&M/dedicated node 700 gets information related to all base stations/eNode B and the measurement period or associated parameter is configured by O&M/dedicated node 700 at all eNode Bs 32.

The second node (i.e. the serving node) may determine the value of the parameter for a particular measurement quantity by any of the mechanisms described in the preceding sections. The second node uses the determined parameter in the following ways. For example, the second node may also signal the determined parameter associated with the measurement period of the measurement quantity to other nodes e.g. to the first node (e.g. neighboring eNode Bs) or even to the third node (e.g. O&M, OSS, SON etc) if the parameter is modified. The receiving first or third node can use them for various purposes. For example the first node can use this to compare with and determine its own parameter value for different measurements. The third node (e.g. SON, OSS etc) may use the received parameter for network optimization and planning.

According to an exemplifying embodiment, firstly the second node (e.g. serving eNode B, RNC, positioning node, relay node etc) signals the determined parameter to the user equipment. The determination of the parameter is based on the principles described in the preceding sections. The serving eNode B or RNC may signal it to the user equipment via RRC protocol. The positioning node in LTE (i.e. E-SMLC) may signal it to the user equipment via LTE Positioning Protocol (LPP), often referred to as LPP protocol. Furthermore, the serving node may signal more than one value of the parameter or more than one parameter. The first one is used for measurements on the serving cell and the second one is used for measurements on the one or more neighboring cells. The two sets of parameters are also required to be signaled to the user equipment at the time of handover.

Furthermore, according to another embodiment, the determined parameter is signaled to the user equipment also at the time of handover. For example the determined parameter used in the target node may be signaled to the user equipment transparently to the source node. This is the same as the system information of the target cell is provided to the user equipment via the source cell during handover. Otherwise the target node has to signal the determined value after HO when the user equipment is connected to the target node. During the period before receiving any value from the target node the user equipment either has no value for the measurement period or will try to use the value received in the source node. This may not be desirable at different deployment scenarios of multi-carrier configurations. It should be noted that different cells may use different value of the measurement period parameter. The delay in acquiring the new parameter may have, for example, two consequences, i.e., the user equipment may use an old parameter value for performing the measurements on the neighboring cells after or during the handover procedure. This may lead to inconsistent measurement reports. Another consequence is that the user equipment may not perform any new measurements until the new parameter value is acquired from the new cell. The acquisition of the new parameter value may take sometime. This may adversely affect the mobility performance or performance of other time stringent services like emergency calls. For example the user equipment may drop the call especially if the cells are small and/or radio environment is more difficult or challenging (e.g. higher speed).

The exemplifying embodiments described above have been discussed with a focus on LTE, however it will be appreciated that the embodiments herein also are applicable to any system where the measurement period of at least one measurement quality is configurable by the network i.e. associated parameter or the measurement period itself or the related information is signaled to the user equipment by the network. Exemplifying embodiments thus apply to UEs which are CA capable i.e. intra-RAT/single RAT CA or even multi-RAT/inter-RAT CA capable. But in general the embodiments herein can also be applied to any type of user equipment which is non-CA capable, CA capable and capable of measuring on any carrier with and without gaps provided the measurement period is configurable. In UMTS Terrestrial Radio Access Network (UTRAN) this type of information (i.e. related to measurement period) can be exchanged over interfaces such as Iub (between Node B and RNC), Iur (between RNCs) etc. In GSM this can be exchanged between BSC and BTS. It should also be noted that the present disclosure is not restricted to the particular terminology used here. Various terms have been used to describe for example Component Carriers or CCs in short. The present disclosure is therefore applicable to situations where terms like multi-cell or dual-cell operation is described. Furthermore PCC and SCC are also interchangeably called as the Primary Serving Cell (PCell) and Secondary Serving Cell (SCell) or alike. The person skilled in the art should easily understand these terminologies.

The exemplifying embodiments described herein provide numerous benefits and advantages including, but not limited to, the following. They enable the network to adequately determine an appropriate value of the parameter associated with the measurement period in different scenarios: deployment, network configurations, radio conditions etc. They will ensure that the user equipment is able to meet the measurement requirements when performing handover. Additionally, the user equipment does not have to read system information of the target cell to acquire the required parameter for doing measurements. This leads to less complexity in the user equipment.

Figure 8:
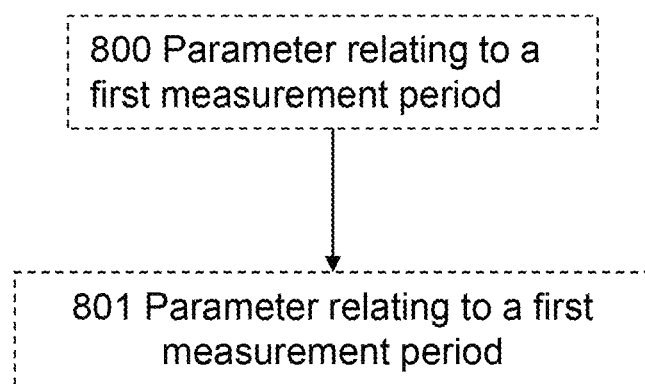
FIG. 8 shows a schematic flow chart of the methods of FIG. 4 when seen from the first radio network node.

FIG. 8 shows an exemplifying flowchart of the methods of FIG. 4 when seen from the first radio network node 110.

The following actions may be performed. Notably, in some embodiments of the method the order of the actions may differ from what is indicated below.

Action 800

This action corresponds to action 200.

In some embodiments, the first radio network node 110 receives and the third network node 130 sends said at least one parameter relating to the first measurement period. In this embodiment, the third network node may be a node managing said at least one parameter for a plurality of radio network nodes, such as the first radio network node 110. In this manner, a set of parameters relating to the first measurement period may be applied to said plurality of radio network nodes. Thus, the set of parameters may be centrally determined by the third network node 130.

Action 801

This action corresponds to action 201.

The first radio network node 110 sends at least one parameter relating to the first measurement period. In some embodiments, the second radio network node 120 receives said at least one parameter relating to the first measurement period from the first radio network node 110. In this manner, the second radio network node 120 is able to determine the first parameter based on said at least one parameter.

Figure 9:
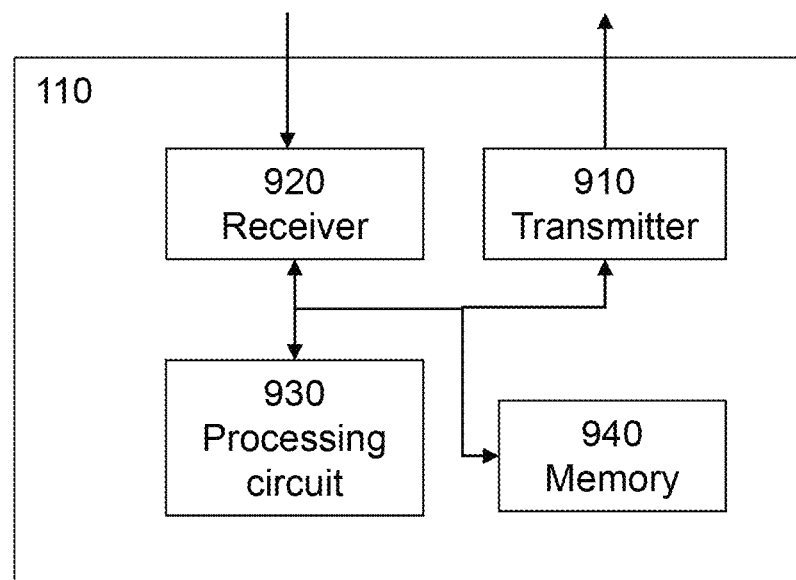
FIG. 9 shows a schematic block diagram of an exemplifying first radio network node configured to perform the methods illustrated in FIG. 8.

FIG. 9 shows a schematic block diagram of an exemplifying first radio network node configured to perform the methods illustrated in FIG. 8. Moreover, the first radio network node 110 is configured to perform the actions performed by the first radio network node 110 as shown in FIG. 4. The first radio network node 110 may be configured to enable the second radio network node 120 to determine the first parameter to be used by the user equipment 140 for measuring at least one measurement quantity on the second cell which serves the user equipment 140. As above, the first parameter relates to the first measurement period. Also as mentioned, the first radio network node 110 is configured to operate the second cell on the second carrier.

In some embodiments of the first radio network node 110, the first radio network node is configured to operate the third cell on the second carrier and the first parameter is to be used by the user equipment 140 for measuring at least one measurement quantity on the third cell.

In some embodiments of the first radio network node 110, said at least one parameter relating to the first measurement period comprises one or more of:

The first parameter to be used by the user equipment 140,
One or more measurement period related parameters received from one or more radio network node neighboring to the second radio network node 120, and
One or more factors relating to deployment.

In some embodiments of the first radio network node 110, said at least one measurement quantity relates to positioning measurement used for determining a position of the user equipment 140. In some examples, said at least one measurement quantity is RSRP, RSTD or RSRQ.

The first radio network node 110 comprises a transmitter 910 configured to send at least one parameter relating to the first measurement period to the second radio network node 120, whereby the second radio network node 120 is able to determine the first parameter based on said at least one parameter.

In some embodiments of the first radio network node 110, the first radio network node 110 further comprises a receiver 920 configured to receive said at least one parameter relating to the first measurement period from the third network node 130.

In some embodiments of the first radio network node 110, the first radio network node 110 further comprises a processing circuit 930.

In some embodiments of the first radio network node 110, the first radio network node 110 further comprises a memory 940 for storing software to be executed by, for example, the processing circuit. The software may comprise instructions to enable the processing circuit to perform the methods in the first radio network node 110 as described above in conjunction with FIG. 4 and FIG. 8.

Figure 10:
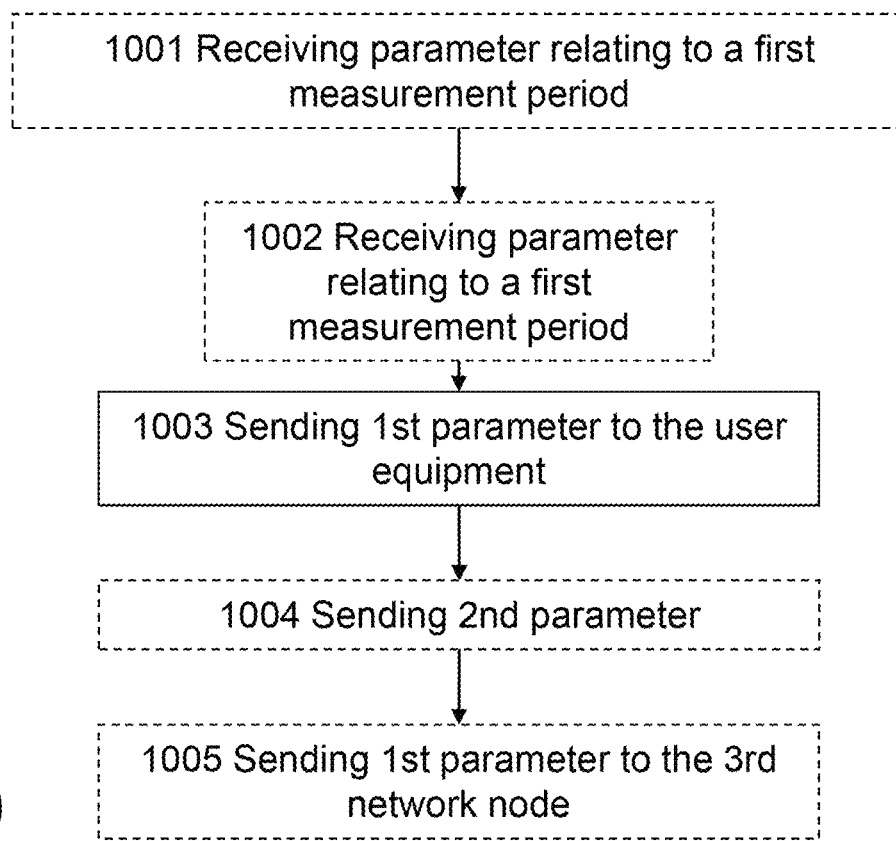
FIG. 10 shows a schematic flow chart of the methods of FIG. 4 when seen from the second radio network node.

FIG. 10 shows an exemplifying flowchart of the methods of FIG. 4 when seen from the second radio network node 120.

The following actions may be performed. Notably, in some embodiments of the method the order of the actions may differ from what is indicated below.

Action 1001

This action corresponds to action 201.

The first radio network node 110 sends at least one parameter relating to the first measurement period. In some embodiments, the second radio network node 120 receives said at least one parameter relating to the first measurement period from the first radio network node 110. In this manner, the second radio network node 120 is able to determine the first parameter based on said at least one parameter.

Action 1002

This action corresponds to action 202.

In some embodiments, the third network node 130 sends and the second radio network node 120 receives said at least one parameter. When the third network node 130 sends said at least one parameter, said at least one parameter may be distributed to one or more radio network nodes. Said one or more radio network nodes may be neighbors to the second radio network node.

Action 1003

This action corresponds to action 203.

The second radio network node 120 sends and the user equipment 140 receives the first parameter and an indication indicative of the second carrier. The first parameter is determined based on a specific length of the first measurement period. As an example, the specific length of the first measurement period may be a desired length of the first measurement period. As explained in below a longer measurement period reduces power consumption of the user equipment. Thus, in some scenarios it may be desired to employ a long measurement period in order to make the user equipment consume less power. In this manner, it may for example be avoided that the user equipment runs out of battery. In addition, reduced power consumption of the user equipment may yield reduced interference to other devices, humans and/or animals located nearby the user equipment.

According to embodiments, in which said at least one parameter comprises one or more measurement period related parameters, the first parameter is determined as one of:

the maximum of said one or more measurement period related parameters,
the minimum of said one or more measurement period related parameters,
the arithmetic mean of said one or more measurement period related parameters,
the geometric mean of said one or more measurement period related parameters, and the like.

Action 1004

This action corresponds to action 204.

In some embodiments, the second radio network node 120 sends and the user equipment 140 receives a second parameter to be used by the user equipment 140 for measuring said at least one measurement quantity on the third cell. The second parameter relates to a second measurement period and the second parameter is determined based on the specific length of the second measurement period.

Action 1005

This action corresponds to action 209.

In some embodiments, the second radio network node 120 sends and the third network node 130 receives the first parameter. Thereby, the third network node 130 may distribute the first parameter to further radio network nodes, such as the first and second radio network nodes 110, 120.

Figure 11:
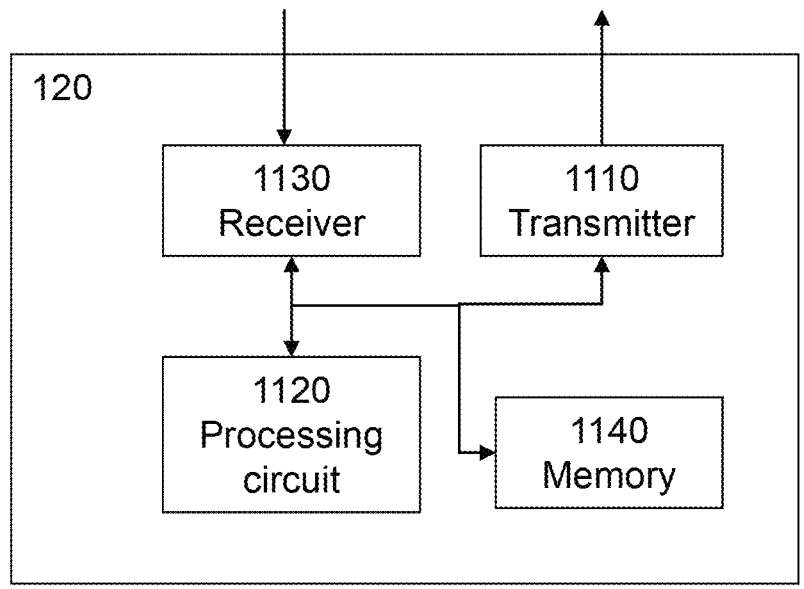
FIG. 11 shows a schematic block diagram of an exemplifying second radio network node configured to perform the methods illustrated in FIG. 10.

FIG. 11 shows a schematic block diagram of an exemplifying second radio network node 120 configured to perform the methods illustrated in FIG. 10. Moreover, the second radio network node 120 is configured to perform the actions performed by the second radio network node 120 as shown in FIG. 4. The second radio network node 120 may be configured to provide the first parameter to be used by the user equipment 140 for measuring at least one measurement quantity on the second cell. As mentioned above, the first parameter relates to the first measurement period. As previously mentioned, the second radio network node 120 is configured to operate the second cell on the second carrier. Again, the second cell is configured to serve the user equipment 140.

In some embodiments of the second radio network node 120, the second radio network node 120 further is configured to operate the first cell on the first carrier. The first cell is configured to serve the user equipment 140 and to provide control information to the user equipment 140.

In some embodiments of the second radio network node 120, the first parameter further is to be used by the user equipment 140 for measuring said at least one measurement quantity on the third cell.

In some embodiments of the second radio network node 120, the first radio network node 110 is configured to operate the third cell on the second carrier.

In some embodiments of the second radio network node 120, said at least one parameter comprises one or more of:
  The first parameter to be used by the user equipment 140, one or more measurement period related parameters received from one or more radio network nodes neighboring to the second radio network node 120, and
  One or more factors relating to deployment.

In some embodiments of the second radio network node 120, said at least one measurement quantity relates to positioning measurement used for determining a position of the user equipment 140. In some examples, said at least one measurement quantity is RSRP, RSTD or RSRQ.

The second radio network node 120 comprises a transmitter 1110 configured to send, to the user equipment 140, the first parameter and the indication indicative of the second carrier, the second parameter is determined based on the specific length of the first measurement period.

In some embodiments of the second radio network node 120, the transmitter 1110 further is configured to send, to the user equipment 140, the second parameter to be used by the user equipment 140 for measuring said at least one measurement quantity on the third cell, the second parameter relates to the second measurement period, and wherein the second parameter is determined based on said at least one parameter relating to measurement periods.

In some embodiments of the second radio network node 120, the transmitter 1110 further is configured to send the first parameter and the indication and/or the second parameter on the first carrier.

In some embodiments of the second radio network node 120, the transmitter 1110 further is configured to send the first parameter to the third network node 130.

According to some embodiments of the second radio network node 120, in which said at least one parameter comprises one or more measurement period related parameters, the second radio network node 120 further comprises a processing circuit 1120 configured to determine the first parameter as one of:

the maximum of said one or more measurement period related parameters,
the minimum of said one or more measurement period related parameters,
the arithmetic mean of said one or more measurement period related parameters,
the geometric mean of said one or more measurement period related parameters, and the like.

In some embodiments of the second radio network node 120, the second radio network node 120 further comprises a receiver 1130 configured to receive said at least one parameter from the first radio network node 110 and/or the third network node 130.

In some embodiments of the second radio network node 120, the second radio network node 120 further comprises a memory 1140 for storing software to be executed by, for example, the processing circuit. The software may comprise instructions to enable the processing circuit to perform the methods in the second radio network node 120 as described above in conjunction with FIG. 4 and FIG. 10.

Figure 12:
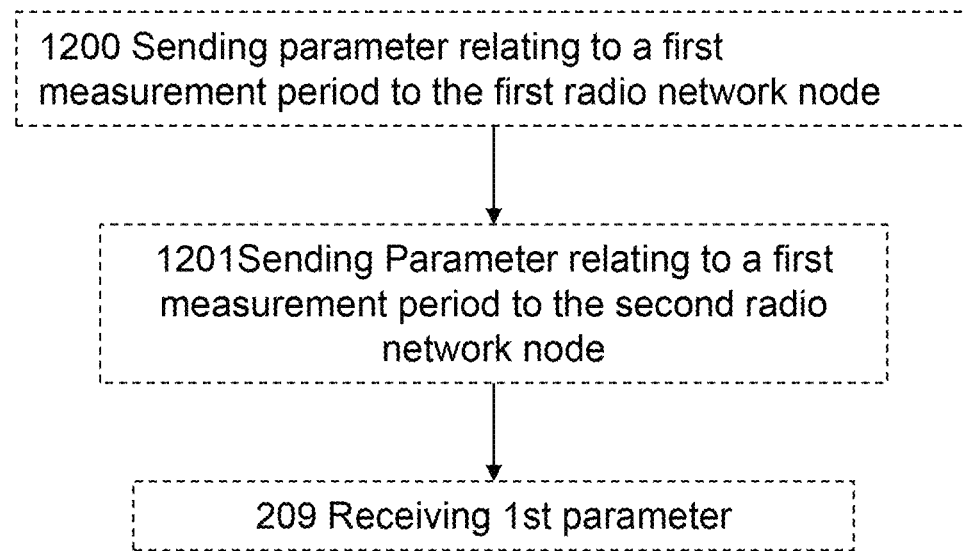
FIG. 12 shows a schematic flow chart of the methods of FIG. 4 when seen from the third network node.

FIG. 12 shows an exemplifying flowchart of the methods of FIG. 4 when seen from the third network node 130.

The following actions may be performed. Notably, in some embodiments of the method the order of the actions may differ from what is indicated below.

Action 1200

This action corresponds to action 200.

In some embodiments, the first radio network node 110 receives and the third network node 130 sends said at least one parameter relating to the first measurement period. In this embodiment, the third network node may be a node managing said at least one parameter for a plurality of radio network nodes, such as the first radio network node 110. In this manner, a set of parameters relating to the first measurement period may be applied to said plurality of radio network nodes. Thus, the set of parameters may be centrally determined by the third network node 130.

Action 1201

This action corresponds to action 202.

In some embodiments, the third network node 130 sends and the second radio network node 120 receives said at least one parameter. When the third network node 130 sends said at least one parameter, said at least one parameter may be distributed to one or more radio network nodes. Said one or more radio network nodes may be neighbors to the second radio network node.

Action 1202

This action corresponds to action 209.

In some embodiments, the second radio network node 120 sends and the third network node 130 receives the first parameter. Thereby, the third network node 130 may distribute the first parameter to further radio network nodes, such as the first and second radio network nodes 110, 120.

Figure 13:
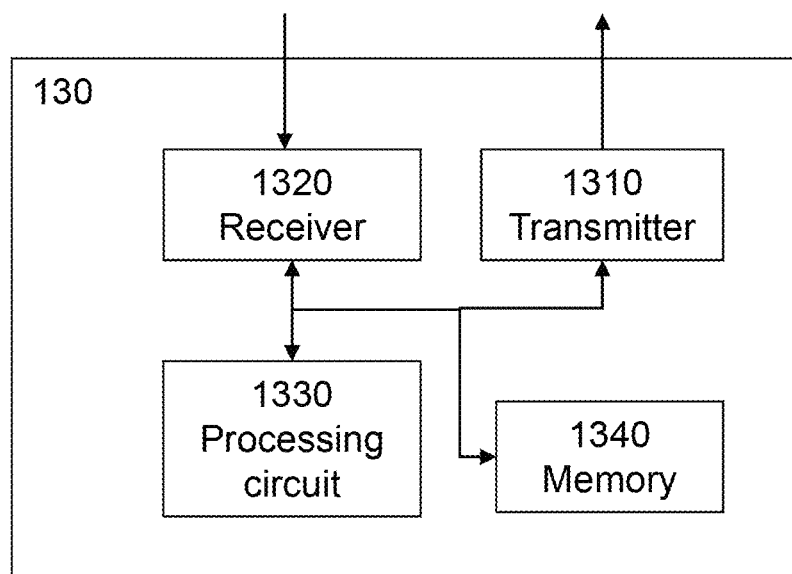
FIG. 13 shows a schematic block diagram of an exemplifying third network node configured to perform the methods illustrated in FIG. 12.

FIG. 13 shows a schematic block diagram of an exemplifying third network node configured to perform the methods illustrated in FIG. 12. Moreover, the third radio network node 130 is configured to perform the actions performed by the third radio network node 130 as shown in FIG. 4. The third network node 130 may be configured to enable the second radio network node 120 to determine the first parameter to be used by the user equipment 140 for measuring at least one measurement quantity on the second cell on the second carrier operated by the second radio network node 120. As mentioned, the first parameter relates to the first measurement period. Also as mentioned, the second cell is configured to serve the user equipment 140.

The third network node 130 comprises a transmitter 1310 configured to send at least one parameter relating to the first measurement period to the second radio network node 120, thereby enabling the second radio network node 120 determine the first parameter based on said at least one parameter.

In some embodiments of the third network node 130, the third radio network node 130 further comprises a receiver 1320 configured to receive the first parameter from the second radio network node 120.

In some embodiments of the third radio network node 130, the third radio network node 130 further comprises a processing circuit 1330.

In some embodiments of the third radio network node 130, the third radio network node 130 further comprises a memory 1340 for storing software to be executed by, for example, the processing circuit. The software may comprise instructions to enable the processing circuit to perform the methods in the third radio network node 130 as described above in conjunction with FIG. 4 and FIG. 12.

Figure 14:
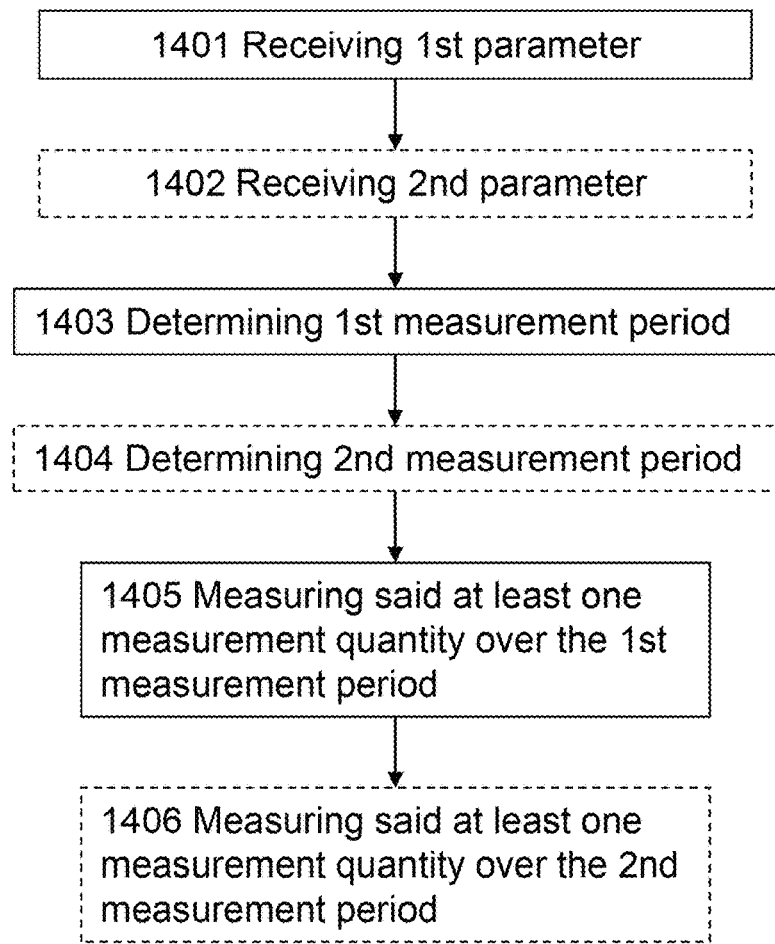
FIG. 14 shows a schematic flow chart of the methods of FIG. 4 when seen from the user equipment.

FIG. 14 shows an exemplifying flowchart of the methods of FIG. 4 when seen from the user equipment 140.

The following actions may be performed. Notably, in some embodiments of the method the order of the actions may differ from what is indicated below.

Action 1401

This action corresponds to action 203.

The second radio network node 120 sends and the user equipment 140 receives the first parameter and an indication indicative of the second carrier. The first parameter is determined based on a specific length of the first measurement period. As an example, the specific length of the first measurement period may be a desired length of the first measurement period. As explained in below a longer measurement period reduces power consumption of the user equipment. Thus, in some scenarios it may be desired to employ a long measurement period in order to make the user equipment consume less power. In this manner, it may for example be avoided that the user equipment runs out of battery. In addition, reduced power consumption of the user equipment may yield reduced interference to other devices, humans and/or animals located nearby the user equipment.

According to embodiments, in which said at least one parameter comprises one or more measurement period related parameters, the first parameter is determined as one of:

the maximum of said one or more measurement period related parameters, the minimum of said one or more measurement period related parameters, the arithmetic mean of said one or more measurement period related parameters, the geometric mean of said one or more measurement period related parameters, and the like.

Action 1402

This action corresponds to action 204.

In some embodiments, the second radio network node 120 sends and the user equipment 140 receives a second parameter to be used by the user equipment 140 for measuring said at least one measurement quantity on the third cell. The second parameter relates to a second measurement period and the second parameter is determined based on the specific length of the second measurement period.

Action 1403

This action corresponds to action 205.

In some embodiments, the user equipment 140 determines the first measurement period based on the first parameter. For example, the user equipment uses a table to map the first parameter to a value (in a time unit, such as ms) of a measurement period. Possibly also a multiplying factor is applied depending on the measurement quantity. As an example, a first measurement quantity may be associated with a multiplying factor of two while a second measurement quantity may be associated with a multiplying factor of five. In this manner, both the first and second measurement quantity are related to the value obtained by the user equipment by the use of for example the table mentioned above.

Action 1404

This action corresponds to action 206.

In some embodiments, the user equipment 140 determines the second measurement period based on the second parameter. For example, the user equipment uses a table to map the second parameter to a value of a measurement period. As an example, the value of the measurement period may be expressed in a time unit such as ms. Possibly also a multiplying factor is applied depending on the measurement quantity. The second parameter may also be one of the parameters of the set of parameters available to the first parameter.

Action 1405

This action corresponds to action 207.

In some embodiments, the user equipment 140 measures said at least one measurement quantity on at least the second cell on the second carrier over the first measurement period.

In some embodiments, the measuring further comprises measuring said at least one measurement quantity on the third cell on the second carrier over the first measurement period.

Action 1406

This action corresponds to action 208.

In some embodiments, the user equipment 140 measures said at least one measurement quantity on the third cell on the second carrier over the second measurement period.

The determined parameter, such as the first and second parameter, can be different for different measurements or common for more than one type of measurement. The parameter can be user equipment specific or common for all UEs in a cell. The parameter can also be specific to each secondary or inter-frequency carrier or common for all carriers or for a group of carriers. The carrier aggregation can be used in different deployment scenarios e.g. indoor, outdoor etc. Similarly, different types of antenna configuration may be used for different component carriers. Furthermore, different component carriers may belong to different frequency bands, which may be associated with different coverage. For example, two component carriers, belonging to frequency bands 900 MHz and 2.6 GHz, respectively, may generate coverage areas, which have a coverage difference in the order of 7-8 dB. Therefore, in scenarios involving different deployment environments, system configurations and/or frequency characteristics of component carriers, it is preferred that the parameter is specific to each component carrier rather than the parameter is common for all or for a group of carriers.

Thus, according to embodiments where different parameters are used for different cells, the second parameter is only used by the user equipment for performing measurements on the neighboring cells. This is in contrast to the first parameter, which is based only on the serving node, i.e. not on exchange of information over X2 in LTE, and which can be used for performing measurement only on the serving cell. This means the user equipment uses the serving node specific parameter for performing serving cell measurements. In case of CA, the common parameter (i.e. second parameter) can be used by the user equipment for performing measurements on the neighboring cells on the SCC. In case of CA, the first parameter can be used by the user equipment for performing measurements on the serving cell on the SCC. The rationale is that neighboring cells may have different deployment scenario or radio environment requiring different parameter value compared to that used in the serving cell. Thus according to this arrangement two sets of parameters (serving cell specific and neighbor cell specific can be signaled to the user equipment. Furthermore each of serving cell specific parameter or neighbor cell specific parameter can still be common to all UEs in a cell or specific to one user equipment or can be specific to each secondary/inter-frequency carrier or any combinations thereof.

Figure 15:
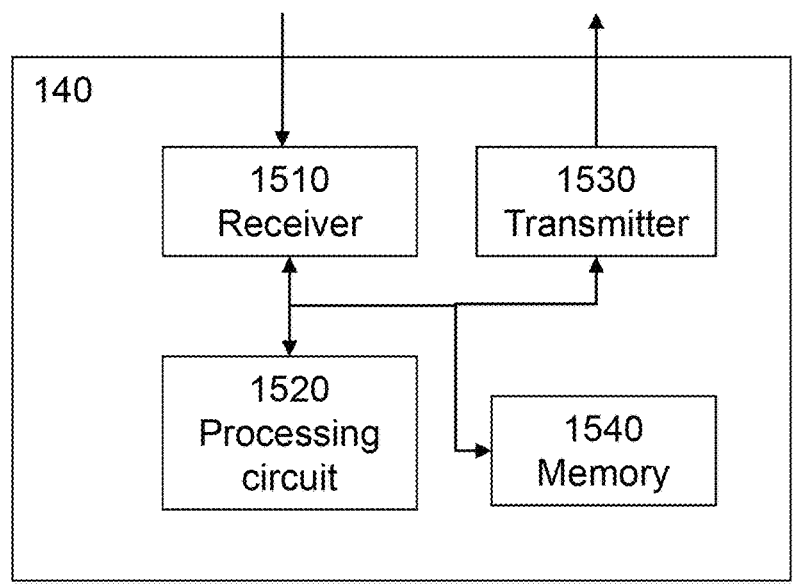
FIG. 15 shows a schematic block diagram of an exemplifying user equipment configured to perform the methods illustrated in FIG. 14.

FIG. 15 shows a schematic block diagram of an exemplifying user equipment configured to perform the methods illustrated in FIG. 14. Moreover, the user equipment 140 is configured to perform the actions performed by the user equipment 140 as shown in FIG. 4. The user equipment 140 may be configured to measure at least one measurement quantity on the second cell on the second carrier operated by the second radio network node 120. As mentioned, the user equipment 140 is configured to be served by at least the second cell.

In some embodiments of the user equipment 140, the first radio network node 110 is configured to operate the third cell on the second carrier.

In some embodiments of the user equipment 140, the second radio network node 120 further is configured to operate the first cell on the first carrier. As mentioned, the user equipment 140 is configured to be served by the first cell which is configured to provide control information to the user equipment 140.

The user equipment 140 comprises a receiver 1510 configured to receive, from the second radio network node 120, the indication indicative of the second carrier and the first parameter to be used by the user equipment for measuring said at least one measurement quantity. The first parameter relates to at least the first measurement period.

In some embodiments of the user equipment 140, the receiver 1510 further is configured to receive, from the second radio network node 120, the second parameter to be used by the user equipment for measuring said at least one measurement quantity, the second parameter relates to the second measurement period.

The user equipment 140 further comprises a processing circuit 1520 configured to determine the first measurement period based on the first parameter; wherein the processing circuit 1520 further is configured to measure said at least one measurement quantity on at least the second cell on the second carrier over the first measurement period.

In some embodiments of the user equipment 140, the processing circuit 1520 further is configured to measure said at least one measurement quantity on the third cell on the second carrier over the first measurement period.

In some embodiments of the user equipment 140, the processing circuit 1520 further is configured to determine the second measurement period based on the second parameter, and measure said at least one measurement quantity on the third cell on the second carrier over the second measurement period.

In some embodiments of the user equipment 140, the user equipment 140 further comprises a transmitter 1530. The transmitter may be configured for communication with the first and/or second radio network node 110, 120.

In some embodiments of the user equipment 140, the user equipment 140 further comprises a memory 1540 for storing software to be executed by, for example, the processing circuit. The software may comprise instructions to enable the processing circuit to perform the methods in the user equipment 140 as described above in conjunction with FIG. 4 and FIG. 14.

As used herein, the term "processing circuit" denotes a processing unit, a processor, an application specific integrated circuit (ASIC), a field-programmable gate array (FPGA) or the like. As an example, a processor, an ASIC, an FPGA or the like may comprise one or more processor kernels.

As used herein, the term "memory" denotes a hard disk, a magnetic storage medium, a portable computer diskette or disc, flash memory, random access memory (RAM) or the like. Furthermore, the memory may be an internal register memory of a processing circuit.

Figure 16:
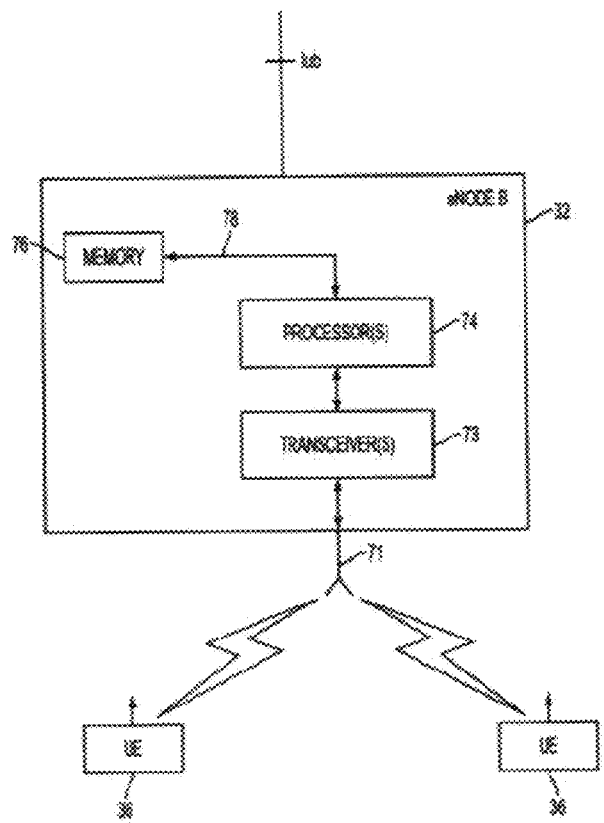
FIG. 16 shows an exemplifying base station.

An exemplifying base station 32, e.g., an eNodeB, which can receive and/or transmit parameters associated with uplink control signals processed as described above is generically illustrated in FIG. 16. Therein, the eNodeB 32 includes one or more antennas 71 connected to processor(s) 74 via transceiver(s) 73. The processor 74 is configured to analyze and process signals received over an air interface via the antennas 71, as well as those signals received from core network node (e.g., access gateway) via, e.g., an interface. The processor(s) 74 may also be connected to one or more memory device(s) 76 via a bus 78. Further units or functions, not shown, for performing various operations as encoding, decoding, modulation, demodulation, encryption, scrambling, pre-coding, etc., and as described above, may optionally be implemented not only as electrical components but also in software or a combination of these two possibilities as would be appreciated by those skilled in the art to enable the transceiver(s) 72 and processor(s) 74 to process uplink and downlink signals. A similar, generic structure, e.g., including a memory device, processor(s) and a transceiver, can be used (among other things) to implement communication nodes such as UEs 36 to receive information or parameter(s) related to period(s) for making measurements, making such measurements and transmitting measurement reports in the manner described above.

Figure 17:
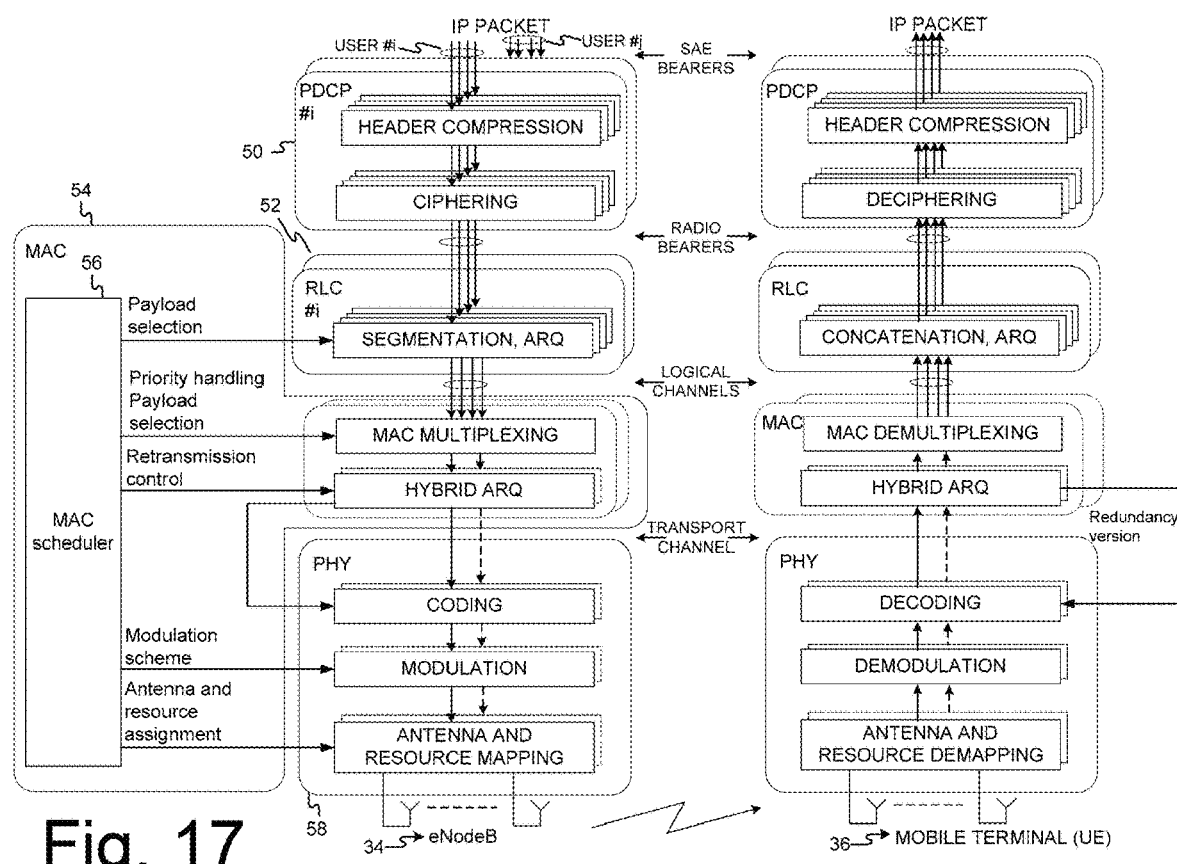
FIG. 17 shows an exemplifying LTE architecture.

One exemplifying LTE architecture for processing data for transmission by an eNodeB 32 to a user equipment 36 (downlink) is shown in FIG. 17. Therein, data to be transmitted by the eNodeB 32 (e.g., IP packets) to a particular user is first processed by a packet data convergence protocol (PDCP) entity 50 in which the IP headers are (optionally) compressed and ciphering of the data is performed. The radio link control (RLC) entity 52 handles, among other things, segmentation of (and/or concatenation of) the data received from the PDCP entity 50 into protocol data units (PDUs). Additionally, the RLC entity 52 provides a retransmission protocol (ARQ) which monitors sequence number status reports from its counterpart RLC entity in the user equipment 36 to selectively retransmit PDUs as requested. The medium access control (MAC) entity 54 is responsible for uplink and downlink scheduling via scheduler 56, as well as the hybrid-ARQ processes discussed above. A physical (PHY) layer entity 58 takes care of coding, modulation, and multi-antenna mapping, among other things. Each entity shown in FIG. 4 provides outputs to, and receives inputs from, their adjacent entities by way of bearers or channels as shown. The reverse of these processes are provided for the user equipment 36 as shown in FIG. 4 for the received data, and the user equipment 36 also has similar transmit chain elements as the eNB 32 for transmitting on the uplink toward the eNB 32, as will be described in more detail below particularly with respect to uplink control signaling.

The above-described exemplifying embodiments are intended to be illustrative in all respects, rather than restrictive, of the present disclosure. All such variations and modifications are considered to be within the scope and spirit of the embodiments herein as defined by the following claims. No element, act, or instruction used in the description of the present application should be construed as critical or essential to the embodiments herein unless explicitly described as such. Also, as used herein, the article "a" is intended to include one or more items.

The invention claimed is:

1. A method in a second radio network node for providing a first parameter to be used by a user equipment for measuring at least one measurement quantity on a second cell in the context of carrier aggregation, wherein the first parameter relates to a first measurement period, wherein the second radio network node operates the second cell on a second carrier, wherein the second cell and a primary cell on a first carrier serve user equipment, the method comprising:
sending, to the user equipment, the first parameter and an indication indicative of the second carrier, wherein the first parameter is determined based on a specific length of the first measurement period and wherein the first parameter is specific to the second carrier.

2. The method according to claim 1, wherein a first radio network node operates a third cell on the second carrier.

3. The method according to claim 2, wherein the first parameter further is to be used by the user equipment for measuring the measurement quantity on the third cell.

4. The method according to claim 2, further comprising:
sending, to the user equipment, a second parameter indicating another measurement period for measuring the measurement quantity on the third cell, wherein the another measurement period is a predefined value times the second parameter.

5. The method according to claim 1, wherein the first parameter is related to at least one parameter relating to the measurement period, wherein the at least one parameter relating to the measurement period comprises one or more of:
the first parameter to be used by the user equipment,
one or more measurement period related parameters received from one or more radio network nodes neighboring to the second radio network node, and
one or more factors relating to deployment.

6. The method according to claim 1, wherein the second radio network node further operates the primary cell on the first carrier, wherein the primary cell is configured to provide control information to the user equipment.

7. The method according to claim 6, wherein the sending of the first parameter and the indication and/or the second parameter is on the first carrier.

8. The method according to claim 5, when said at least one parameter comprises one or more measurement period related parameters, wherein the first parameter is determined as one of:
the maximum of said one or more measurement period related parameters,
the minimum of said one or more measurement period related parameters,
the arithmetic mean of said one or more measurement period related parameters, and
the geometric mean of said one or more measurement period related parameters.

9. The method according to claim 1, further comprising:
receiving said at least one parameter from a first radio network node and/or a third network node.

10. The method according to claim 1, further comprising:
sending the first parameter to a third network node.

11. The method according to claim 1, wherein the measurement quantity relates to positioning measurement used for determining a position of the user equipment.

* * * * *

UNITED STATES PATENT AND TRADEMARK OFFICE
CERTIFICATE OF CORRECTION

PATENT NO. : 11,589,249 B2
APPLICATION NO. : 17/228774
DATED : February 21, 2023
INVENTOR(S) : Kazmi et al.

It is certified that error appears in the above-identified patent and that said Letters Patent is hereby corrected as shown below:

In the Specification

In Column 9, Line 3, delete "(out of sync" and insert -- (out of sync) --, therefor.

In Column 9, Line 4, delete "(in-sync" and insert -- (in-sync) --, therefor.

In Column 13, Line 10, delete "$\delta 1$" and insert -- $\Omega 1$ --, therefor.

In Column 13, Line 27, delete "$\delta 1$" and insert -- $\Omega 1$ --, therefor.

In Column 15, Line 7, delete "specific" and insert -- specific) --, therefor.

In Column 27, Line 9, delete "specific" and insert -- specific) --, therefor.

Signed and Sealed this
Tenth Day of October, 2023

Katherine Kelly Vidal
*Director of the United States Patent and Trademark Office*